(12) United States Patent
Zou

(10) Patent No.: US 11,778,704 B2
(45) Date of Patent: Oct. 3, 2023

(54) CONTROL METHOD AND CONTROL SYSTEM FOR LIGHT FIXTURE, AND ELECTRONIC DEVICE

(71) Applicant: SHENZHEN MERRYTEK TECHNOLOGY CO., LTD., Shenzhen (CN)

(72) Inventor: Gaodi Zou, Shenzhen (CN)

(*) Notice: Subject to any disclaimer, the term of this patent is extended or adjusted under 35 U.S.C. 154(b) by 547 days.

(21) Appl. No.: 16/959,124

(22) PCT Filed: Dec. 29, 2017

(86) PCT No.: PCT/CN2017/119705
§ 371 (c)(1),
(2) Date: Sep. 2, 2020

(87) PCT Pub. No.: WO2019/127317
PCT Pub. Date: Jul. 4, 2019

(65) Prior Publication Data
US 2022/0353973 A1  Nov. 3, 2022

(30) Foreign Application Priority Data

Dec. 27, 2017 (CN) .......................... 201711445746.3
Dec. 29, 2017 (WO) ................ PCT/CN2017/119705

(51) Int. Cl.
*H05B 45/20* (2020.01)
*H05B 47/125* (2020.01)
*H05B 47/155* (2020.01)
*H05B 45/10* (2020.01)

(52) U.S. Cl.
CPC ............. *H05B 45/20* (2020.01); *H05B 45/10* (2020.01); *H05B 47/125* (2020.01); *H05B 47/155* (2020.01)

(58) Field of Classification Search
None
See application file for complete search history.

(56) References Cited

U.S. PATENT DOCUMENTS

| 8,876,289 | B2* | 11/2014 | Dorronsoro Diaz | A61B 3/10 |
| | | | | 351/203 |
| 9,036,245 | B2* | 5/2015 | Hewlett | F21V 14/08 |
| | | | | 345/207 |
| 2009/0323026 | A1* | 12/2009 | Mizushima | G09G 3/02 |
| | | | | 345/694 |
| 2014/0309782 | A1* | 10/2014 | Sharpe | G01N 15/1404 |
| | | | | 700/266 |
| 2017/0280029 | A1* | 9/2017 | Steiner | H04N 9/64 |

* cited by examiner

Primary Examiner — Wilson Lee

(57) ABSTRACT

A control system includes a scheme generation module and a control unit communicatively coupled to the scheme generation module. The scheme generation module generates a control scheme according to an optical image of an illuminated object. Upon execution of the control scheme, the control unit controls the status of the light fixture according to the content of the control scheme, such that the status of the light fixture matches the status of the illuminated object, thereby facilitating improvement of the display effect of the illustrated object.

19 Claims, 11 Drawing Sheets

CONTROL METHOD AND CONTROL SYSTEM FOR LIGHT FIXTURE, AND ELECTRONIC DEVICE

CROSS REFERENCE OF RELATED APPLICATION

This is a non-provisional application that claims priority to international application number PCT/CN2017/119705, international filing date Jul. 4, 2019, which claims priority to Chinese Patent Application, application number CN 201711445746.3, filed Dec. 29, 2017, the entire contents of each of which are expressly incorporated herein by reference.

BACKGROUND OF THE PRESENT INVENTION

Field of Invention

The present invention relates to a light fixture, and more particularly to a control system, control method, and its electronic device for a light fixture.

Description of Related Arts

In the field of display, light fixtures or luminaires are commonly used for creating a display effect of the objects to be displayed. For example, when multiple light fixtures are arranged with each, the light fixtures can provide different types of light effects and illuminate the displayed object at different angles. In one application, for displaying a stationary object such as a sale product, the light provided by the light fixtures can enhance the aesthetic appearance of the objects to be displayed. In another application, for displaying a dynamic displayed object (for example the displayed objects can be actors, models, animals, dynamic props, etc.) on a stage, a fashion show walkway and other places, the designer can comprehensively achieve his or her creative idea through the lights provided by the light fixtures.

It is known that the chromaticity (mainly including color temperature and color) and light intensity of the light fixture must match with the surroundings of the displayed object in order to improve the display effect thereof. If the light provided by the light fixture does not match with the surroundings of the displayed object, the display effect will not be enhanced. In fact, it will give negative influences for the displayed object.

For a market place for selling clothing, accessories, and food, the installation angle and lighting of the light fixture are determined and fixed by the designer or the lighting engineer according to the object to be initially displayed. In other words, once the installation angle and lighting of the light fixture are set and fixed, it is difficult to change. However, due to the time change (such as seasonal change), the type of displayed object will be correspondingly changed. When type of displayed object is changed to a new object to be displayed, the installation angle and lighting of the light fixture will mismatch with the new displayed object so as to affect the display effect thereof. It is appreciated that after the displayed object is changed, the installation angle and lighting of the light fixture can be adjusted to match with the new displayed object. However, the ordinary employees, such as salesperson, has lack of lighting distributing knowledge to adjust installation angle and lighting of the light fixture to match with the new displayed object. On the other hand, it is unaffordable for the market place owner to pay additional expenses for experienced designers or lighting engineers to adjust the installation angle and lighting of the light fixture every time when changing the displayed object.

For the places, such as stages and fashion show walkway, the objects must be displayed dynamically. As movements of the displayed objects and the movement change of the objects, the installation angles and lightings of the light fixtures are also different. Therefore, it is required for experienced lighting engineers to operate on the spot in the process of dynamically displaying the displayed objects in a real time manner. However, due to a large number of light fixtures being used in the place, such as the stage or the fashion show walkway, there are several drawbacks for adjusting the light fixtures in a real time manner. Firstly, it is difficult for a single lighting engineer to control a large number of light fixture at the same time. Secondly, even though different numbers of light fixture can be grouped into different light groups for adjusting the light intensities of the light groups by different lighting engineers, the lighting engineers must well communicate with each other to control different light groups as a team. Practically, there will be a defect of mismatching different light groups controlled by different lighting engineers. Once any one of the light groups is mismatched with others, the display effect of the displayed object will be inevitably affected. In addition, the laboring cost of the lighting engineer is often relatively expensive. In other words, by hiring a large number of lighting engineers to control the lamps on the spot, the desired display effect cannot be guaranteed and the cost is relatively expensive.

SUMMARY OF THE PRESENT INVENTION

The invention is advantageous in that it provides a control method and a control system for a light fixture and an electronic device thereof, wherein the control system is adapted to improve the display effect of a displayed object.

Another advantage of the invention is to provide a control method and a control system for a light fixture and an electronic device thereof, wherein the control system is able to improve the display effect of the displayed object while being cost effective.

Another advantage of the invention is to provide a control method and a control system for a light fixture and an electronic device thereof, wherein the control system is configured to control the status of at least one light fixture, such that the status of the light fixture can match with the status of the displayed object to improve the display effect of the displayed object. For example, the control system can control and adjust at least one parameter of the color temperature, illuminance, and color of the light fixture in order to match the status of the light fixture with the status of the displayed object so as to improve the display effect of the displayed object.

Another advantage of the invention is to provide a control method and a control system for a light fixture and an electronic device thereof, wherein the control system is configured to control the light fixture in response to the real-time status of the displayed object, such that the status of the light fixture is adjusted in a real time manner to match the status of the light fixture with the status of the displayed object so as to further improve the display effect of the displayed object.

Another advantage of the invention is to provide a control method and a control system for a light fixture and an electronic device thereof, wherein the control system is configured to automatically adjust the status of the light fixture in response to the real-time status of the displayed object, such that the status of the light fixture will match with the status of the displayed object. In other words, the control system is configured to initiatively adjust the status of the light fixture according to the status of the displayed object without any labor involvement in the entire process, thereby realizing automatic control of the light fixture.

Another advantage of the invention is to provide a control method and a control system for a light fixture and an electronic device thereof, wherein the control system comprises an information collection unit to obtain the real-time status of the displayed object by collecting optical images of the displayed object in a real time manner.

Another advantage of the invention is to provide a control method and a control system for a light fixture and an electronic device thereof, wherein the processing module is configured to distinguish an optical image of the illuminated object from an optical image of the display environment according to the optical image of the displayed object, such that the control system is configured to subsequently change and adjust the status of the light fixture to better display the illuminated object.

Another advantage of the invention is to provide a control method and a control system for a light fixture and an electronic device thereof, wherein the control system comprises a light blending module, wherein the light blending module is configured to blend and mix the chromaticity of the optical image of the displayed object in a predetermined light blending mode to obtain a light group.

Another advantage of the invention is to provide a control method and a control system for a light fixture and an electronic device thereof, wherein the processing unit comprises a detection unit, wherein the detection unit is configured to perform chromaticity detection on the light group to obtain a detection result. The type of the light group can be determined according to the detection result. For example, the detection unit can detect the RGB combination ratio value of the light group, and the type of the light group can be determined according to the RGB combination ratio value of the light group. Alternatively, the detection unit can detect the chromaticity tendency of the light group, and the type of the light group can be determined according to the chromaticity tendency of the light group.

Another advantage of the invention is to provide a control method and a control system for a light fixture and an electronic device thereof, wherein the processing unit comprises a search unit and an expert database for storing at least one data of chromaticity to be output corresponding to various types of the light group, wherein the search unit can search the chromaticity to be output corresponding to the detection result in the expert database.

Another advantage of the invention is to provide a control method and a control system for a light fixture and an electronic device thereof, wherein the control system comprises a scheme generation unit and a control unit, wherein the scheme generation unit is configured to generate a control scheme according to the chromaticity to be output, wherein the control unit is configured to control the status of the light fixture according to the content of the control scheme when executing the control scheme. Thus, the light fixture is configured to project a suitable type of light to the illuminated object at an appropriate angle to improve the display effect of the illuminated object.

Another advantage of the invention is to provide a control method and a control system for a light fixture and an electronic device thereof, wherein the control system comprises a scheme generation unit and a control unit, wherein the scheme generation unit is configured to provide an adjustment scheme according to the real-time optical image of the displayed object, wherein the control unit is configured to adjust the status of the light fixture according to the content of the adjustment scheme when executing the adjustment scheme so as to further improve the display effect of the illuminated object.

Another advantage of the invention is to provide a control method and a control system for a light fixture and an electronic device thereof, wherein the information collection unit is communicatively connected to at least one image acquisition device to acquire the optical image of the displayed object.

Another advantage of the invention is to provide a control method and a control system for a light fixture and an electronic device thereof, wherein the image acquisition device is configured to obtain the real-time optical image of the displayed object in a real time manner.

Another advantage of the invention is to provide a control method and a control system for a light fixture and an electronic device thereof, wherein the information collection unit of the control system is communicatively connected to at least one color sensor to obtain the light group regarding the optical image of the displayed object.

Another advantage of the invention is to provide a control method and a control system for a light fixture and an electronic device thereof, wherein the control system is configured to obtain an optical image of the displayed object after emitting a predetermined type of light to the displayed object, wherein the chromaticity of the optical image of the displayed object can be determined according to the characteristic value of the color of the obtained optical image of the displayed object and the characteristic value of the color of the light emitted to the displayed object, in such a manner that the control system can more accurately obtain the chromaticity of the optical image of the displayed object.

Another advantage of the invention is to provide a control method and a control system for a light fixture and an electronic device thereof, wherein the control system is configured to reduce or shield the ambient light on the optical image of the displayed object to minimize the affect thereof by emitting light of a predetermined type to the displayed object. For example, the control system is configured to reduce or shield the ambient light on the optical image of the displayed object by emitting white light to the displayed object, such that the control system can more accurately obtain the chromaticity of the optical image of the displayed object.

Another advantage of the invention is to provide a control method and a control system for a light fixture and an electronic device thereof, wherein the information collection unit is configured to obtain a brightness signal of the displayed object to subsequently adjust the working status of the light fixture, such as to adjust the illuminance of the light output by the light fixture, in such a manner that the working status of the light fixture can be more accurately matched with the displayed object.

Another advantage of the invention is to provide a control method and a control system for a light fixture and an electronic device thereof, wherein the brightness of the displayed object can be preset to subsequently adjust the working status of the light fixture, such as adjusting the light intensity of the light output by the light fixture, in such a manner that the working status of the light fixture can be more accurately matched with the displayed object.

Another advantage of the invention is to provide a control method and a control system for a light fixture and an electronic device thereof, wherein the electronic device can be easily connected to at least one of the light fixtures and at least one of the image acquisition devices, such that the status of the light fixture is easily controlled by the electronic device to match the status of the light fixture with the status of the illuminated object acquired by the image acquisition device.

Another advantage of the invention is to provide a control method and a control system for a light fixture and an electronic device thereof, wherein the electronic device is easily movable which is beneficial to expand the application range of the electronic device.

According to the present invention, the foregoing and other objects and advantages are attained by a control system for controlling at least one light fixture generating light to illuminate an illuminated object, wherein the control system comprises:

a scheme generation module, wherein the scheme generation unit comprises a control scheme generation module, wherein the control scheme generation module is configured to generate a control scheme based on an optical image of the illuminated object; and a control unit, wherein the control unit comprises a control module, wherein the control module is communicatively connected to the control scheme generation module, wherein the control module is configured for controllably connecting to the light fixture, wherein the control unit is configured for controlling a status of the light fixture according to a content of the control scheme when the control unit executes the control scheme.

In one embodiment, the control system further comprises:

a processing unit, wherein the processing unit is configured to blend and mix a chromaticity of the optical image of the illuminated object to obtain a light group;

a detection unit, wherein the detection unit is communicatively connected to the processing unit, wherein the detection unit is configured to perform chromaticity detection on the light group to obtain a detection result;

an expert database, wherein the expert database provides at least one data of chromaticity to be output; and a search unit, wherein the search unit is communicatively connected to the detection unit and the expert database, wherein the control scheme generation module is communicatively connected to the search unit, wherein the search unit is configured to search the chromaticity to be output corresponding to the detection result from the expert data, wherein the chromaticities to be output is searched corresponding to the optical image of the illuminated object.

In one embodiment, the control system further comprises:

an information collection unit, wherein the information collection unit is configured to obtain a light group regarding the optical image of the illuminated object;

a detection unit, wherein the detection unit is communicatively connected to the information collection unit, wherein the detection unit is configured to perform chromaticity detection on the light group to obtain a detection result;

an expert database, wherein the expert database provides at least one data of chromaticity to be output; and a search unit, wherein the search unit is communicatively connected to the detection unit and the expert database, wherein the control scheme generation module is communicatively connected to the search unit, wherein the search unit is configured to search the chromaticity to be output corresponding to the detection result from the expert data, wherein the chromaticities to be output is searched corresponding to the optical image of the illuminated object.

According to one embodiment of the present invention, the control system further comprises an information collection unit, wherein the information collection unit is communicatively connected to the processing unit, wherein the information collection unit is communicatively connected to an image acquisition device, wherein the image acquisition device is configured to acquire the optical image of the illuminated object.

According to one embodiment of the present invention, the scheme generation module further comprises an adjustment scheme generation module, wherein the control unit further comprises an adjustment module, wherein the adjustment module is communicatively connected to the adjustment scheme generation module, wherein the adjustment module is configured for controllably connecting to the light fixture, wherein the adjustment scheme generation module is configured to generate an adjustment scheme based on the optical image of the illuminated object in a real time manner, wherein the adjustment module is configured to adjust the status of the light fixture according to the content of the adjustment scheme when the adjustment module executes the adjustment scheme.

According to one embodiment of the present invention, the processing unit further comprises a processing module and a light blending module, wherein the light blending module is communicatively connected to the processing module and the detection unit, wherein the processing module is configured to analyze the optical image of the illuminated object to determine the chromaticity of the optical image of the illuminated object, wherein the light blending module is configured to blend and mix the chromaticity of the optical image of the illuminated object in a predetermined light blending mode to obtain the light group.

According to one embodiment of the present invention, the light blending module is configured to blend and mix all chromaticities of the illuminated object in a predetermined light blending mode to obtain the light group, alternatively, the light blending module is configured to blend and mix a specific chromaticity of the illuminated object in a predetermined light blending mode to obtain the light group.

According to one embodiment of the present invention, the light blending mode of the light blending module is to average all chromaticities or specific chromaticities of the optical image of the illuminated object.

According to one embodiment of the present invention, the processing module further comprises an analysis sub-module and an identification sub-module, wherein the identification sub-module is communicatively connected to the analysis sub-module, wherein the light blending module is communicatively connected to the identification sub-module, wherein the analysis sub-module is configured to analyze an optical image of a displayed object, wherein the identification sub-module is configured to identify the optical image of the illuminated object in the optical image of the displayed object according to the analysis result of the optical image of the displayed object by the analysis sub-module.

In accordance with another aspect of the invention, the present invention comprises a control method, comprising the steps of:

(a) generating a control scheme based on an optical image of an illuminated object by a control scheme generation module; and (b) when executing the control scheme by a control module, controlling a status of at least one light fixture according to a content of the control scheme, such that the light fixture is controlled to generate light for illuminating the illuminated object.

According to one embodiment of the present invention, before the step (a), the method further comprises the steps of:

(c) blending and mixing the optical image of the illuminated object by a light blending module to obtain a light group;

(d) performing chromaticity detection of the light group by a detection unit to obtain a detection result;

(e) via a search unit, searching a chromaticity to be output corresponding to the detection result from an expert database, wherein the chromaticity to be output corresponds to the optical image of the illuminated object, such that, in the step (a), the control scheme generated by the control scheme generation module is based on the optical image of the illuminated object.

According to one embodiment of the present invention, before the step (a), the method further comprises the steps of:

obtaining a light group regarding the optical image of the illuminated object via an information collection unit;

performing chromaticity detection of the light group by a detection unit to obtain a detection result;

via a search unit, searching a chromaticity to be output corresponding to the detection result from an expert database, wherein the chromaticity to be output corresponds to the optical image of the illuminated object, such that, in the step (a), the control scheme generated by the control scheme generation module is based on the optical image of the illuminated object.

According to one embodiment of the present invention, before the step (c), the method further comprises a step of:

(f) analyzing the optical image of the illuminated object by a processing module to determine the chromaticity of the optical image of the illuminated object, such that, in the step (c), the light blending module is configured to blend and mix the chromaticity of the optical image of the illuminated object in a predetermined light mixing method to obtain the light group.

According to one embodiment of the present invention, the light blending module is configured to blend and mix all chromaticities of the illuminated object in a predetermined light blending mode to obtain the light group, alternatively, the light blending module is configured to blend and mix a specific chromaticity of the illuminated object in a predetermined light blending mode to obtain the light group.

According to one embodiment of the present invention, the light blending mode of the light blending module is to average all chromaticities or specific chromaticities of the optical image of the illuminated object.

According to one embodiment of the present invention, the step (f) further comprises the steps of:

(f.1) analyzing an optical image of a displayed object by an analysis sub-module; and (f.2) via an identification sub-module, identifying the optical image of the illuminated object in the optical image of the displayed object according to the analysis result of the optical image of the displayed object from the analysis sub-module.

According to one embodiment of the present invention, after the step (b), the method further comprises the steps of:

(g) via an adjustment scheme generation module, generating an adjustment scheme based on the optical image of the illuminated object a real-time manner; and (h) when an adjustment module executes the adjustment scheme, controlling the status of the light fixture according to the content of the adjustment scheme.

According to one embodiment of the present invention, before the step (a), the method further comprises a step of:

(i) by communicatively connecting an information collection unit to an image acquisition device, acquiring the optical image of the illuminated object by the image acquisition device.

According to another embodiment of the present invention, the step (i) further comprises the step of:

(i.1) emitting a predetermined type of light to the illuminated object;

(i.2) obtaining the optical image of the displayed object after being illuminated with the predetermined type of light; and (i.3) according to the obtained characteristic value of the color of the optical image of the displayed object and the characteristic value of the predetermined type of light emitted to the illuminated object, obtaining the chromaticity of the optical image of the displayed object.

In accordance with another aspect of the invention, the present invention comprises an electronic device, comprising:

According to another aspect of the present invention, the present invention further provides an electronic device, which includes:

a memory, wherein the memory is configured to store at least a portion of data resources of a control system;

a user interface, wherein the user interface is configured to connect at least one light fixture and at least one image acquisition device; and a central processing unit, wherein the memory and the user interface are communicatively connected to the central processing unit respectively, wherein the central processing unit executes a control system configured to:

(a) by communicatively connecting an information collection unit to the image acquisition device, acquire an optical image of an illuminated object by the image acquisition device;

(b) via a control scheme generation module, generate a control scheme based on the optical image of the illuminated object; and (c) when a control module executes the control scheme, control a status of at least one light fixture according to a content of the control scheme to illuminate the illuminated object by the light generated by the light fixture.

According to one embodiment of the present invention, wherein the central processing unit further executes the control system configured to:

(c) blend and mix the optical image of the illuminated object by a light blending module to obtain a light group;

(d) perform chromaticity detection of the light group by a detection unit to obtain a detection result; and (e) via a search unit, search a chromaticity to be output corresponding to the detection result from an expert database, wherein the chromaticity to be output corresponds to the optical image of the illuminated object, such that, in the step (a), the control scheme generated by the control scheme generation module is based on the optical image of the illuminated object.

According to one embodiment of the present invention, the central processing unit further executes the control system configured to:

(f) analyze the optical image of the illuminated object by a processing module to determine the chromaticity of the optical image of the illuminated object, such that, in the step (c), the light blending module is configured to blend and mix the chromaticity of the optical image of the illuminated object in a predetermined light blending mode method to obtain the light group.

According to one embodiment of the present invention, the central processing unit further executes the control system in the step (f) configured to:

(f.1) analyze the optical image of a displayed object by an analysis sub-module; and (f.2) via an identification sub-module, identify the optical image of the illuminated object in the optical image of the displayed object according to the analysis result of the optical image of the displayed object from the analysis sub-module.

DETAILED DESCRIPTION OF THE PREFERRED EMBODIMENT

The following description is disclosed according to the claims of the present invention and the contents disclosed in the specification, the technical solution of the present invention is as follows.

It is appreciated that the terms "longitudinal", "transverse", "upper", "lower", "front", "rear", "left", "right", "vertical", "horizontal", "top", "bottom", "interior" and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Figure 1:
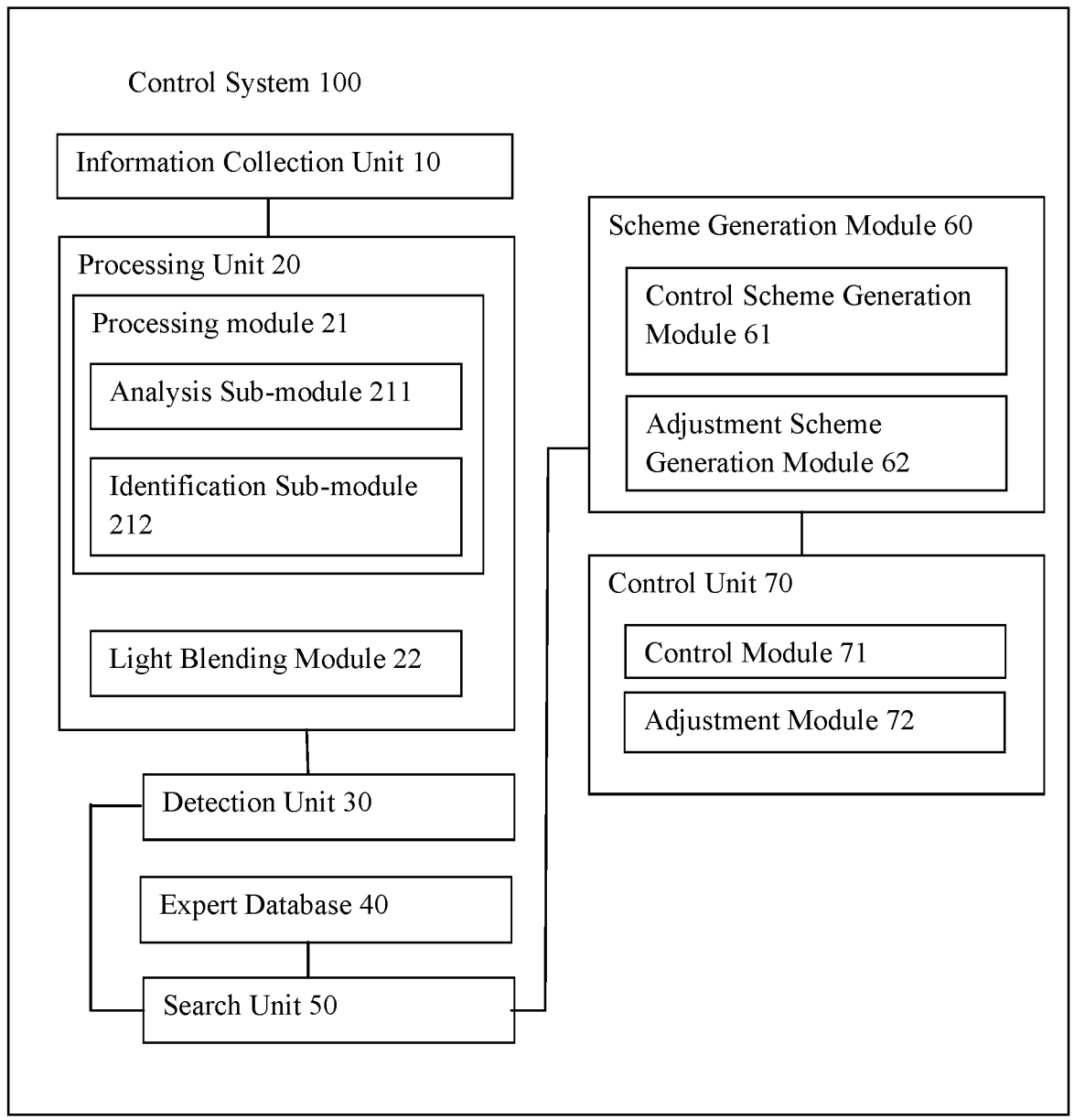
FIG. 1 is a block diagram illustrating a control system of a light fixture according to a preferred embodiment of the present invention.
Figure 2:
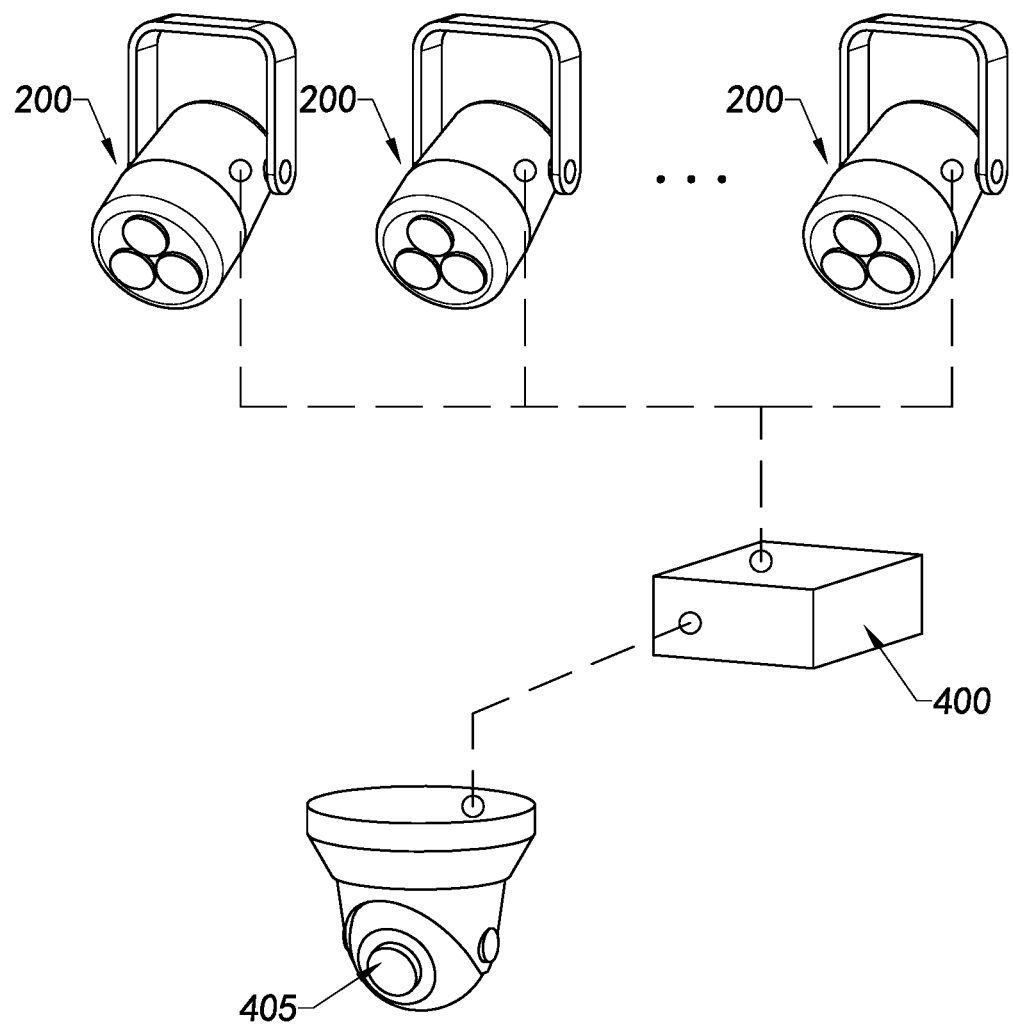
FIG. 2 is a perspective view of the control system of the light fixture according to the above preferred embodiment of the present invention.

Referring to FIGS. 1 and 2 of the drawings, a control system 100 of a light fixture according to a preferred embodiment of the present invention is disclosed and explained in the following description. The control system 100 is arranged to control at least one light fixture 200 to adjust a statue thereof, such that the status of the light fixture 200 can match with the status of a displayed object 300, i.e. the object to be displayed, so as to enhance the display effect of the displayed object 300. For example, the control system 100 is arranged to control at least one parameter of the color temperature, illuminance, and color of the light fixture 200 in order to match the status of the light fixture 200 with the status of the displayed object 300 for enhancing the display effect of the displayed object 300. It is worth mentioning that, in one specific example of the control system 100 of the present invention, the status of light fixture 200 matching with the status of the displayed object 300 refers to the light (light intensity, color, color temperature, illuminance, etc.) and the light angle provided by the light fixture 200 matches with the color, shape, movement, etc. of the displayed object 300 to be displayed so as to enhance the display effect of the displayed object 300.

Generally speaking, the displayed object 300 includes at least one illuminated object 301 and a display environment 302. In one example, the illuminated object 301 is shown in the display environment 302 in a stationary manner. In another example, the illuminated object 301 is movable in the display environment 302 in a dynamic manner.

A person who skilled in the art should understand that the display environment 302 is an environment for displaying the illuminated object 301, and the light generated by the light fixture 200 is mainly arranged to project the light on the illuminated object 301, such that the light fixture 200 and the display environment 302 cooperate with each other to provide a better display the illuminated object 301. Those skilled in the art should understand that the display environment 302 will affect the display effect of the illuminated object 301.

Furthermore, the control system 100 of the present invention is able to match the status of the light fixture 200 with the status of the displayed object 300 via the control of the status of the light fixture 200 to enhance the display effect of the illuminated object 301. Preferably, through the controlling the status of the light fixture 200, the control system 100 is able to match the status of the light fixture 200 with the status of the displayed object 300 in order to improve the display effect of the illuminated object 301 based on the characteristics thereof, such as color, shape, movement, etc. of the illuminated object 301. Of course, a person who skilled in the art should understand that, under the premise of achieving the same display effect, if the types of the display environment 302 are different, such as the colors of the display environment 302 are different, the status requirements of the light fixture 200 will be different. For example, the requirement for at least one of the parameters of the color temperature, illuminance, and color of the light fixture 200 will be different. Therefore, in order to ensure the display effect of the illuminated object 301, the statuses of the illuminated object 301 and the display environment 302 are obtained in real time in order to adjust the status of the light fixture 200 based on the status of the illuminated object 301 in a real time manner. Of course, a person who skilled in the art should understand that when adjusting the status of the light fixture 200 based on the real-time status of the illuminated object 301 to match the status of the light fixture 200 with the real-time status of the illuminated object 301, the real-time status of the display environment 302 must be considered in order to enhance the display effect of the illuminated object 301.

The control system 100 can be integrated into an electronic device 400 to facilitate the subsequent arrangement of the control system 100. For example, in one embodiment, the light fixture 200 may be directly connected to the electronic device 400, and then the electronic device 400 may be placed or set in the display environment 302. As shown in FIG. 2, the electronic device 400 is adapted to adjust the status of the light fixture 200 according to the real-time statuses of the illuminated object 301 and the display environment 302, such that the status of the light fixture 200 matches with the status of the displayed object 300 to enhance the display effect of the illuminated object 301.

It is worth mentioning that the type of the electronic device 400 should not limited in the control system 100 of the present invention. For example, the electronic device 400 may be, but not limited to, a smart phone, a tablet computer, a laptop computer, or a lighting control station.

Figure 3:
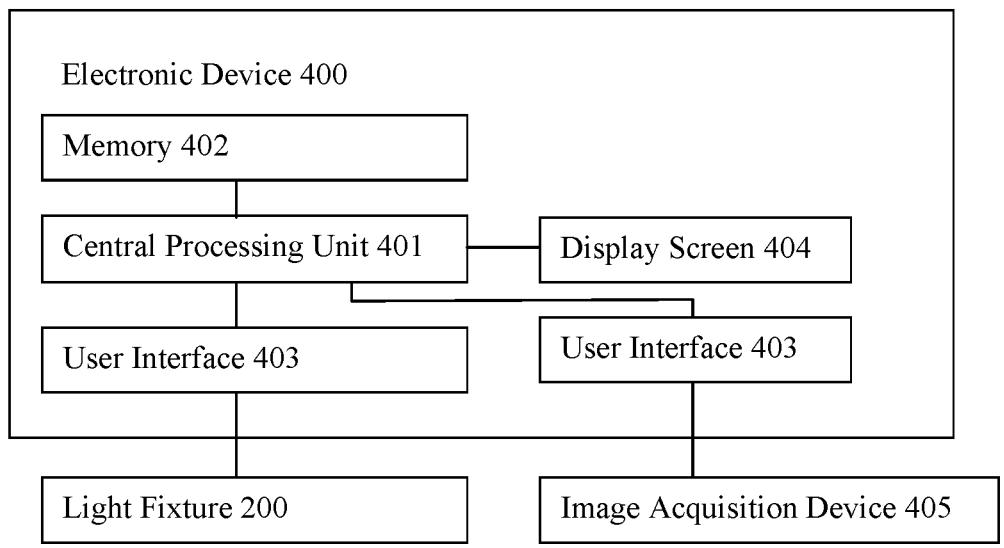
FIG. 3 is a block diagram illustrating an electronic device of the light fixture according to the above preferred embodiment of the present invention.

As shown in FIG. 3, the electronic device 400 comprises at least a central processing unit (CPU) 401, at least one memory 402, and at least one user interface (I/O interface) 403, wherein the memory 402 and the user interface 403 are communicatively connected to the central processing unit 401. At least a portion of the control system 100 can be stored in the memory 402, wherein the light fixture 200 can be connected to the user interface 403. When the central processing unit 401 reads and executes at least the portion of the control system 100 in the memory 402, the central processing unit 401 is able to adjust the status of the light fixture 200. It is worth mentioning that the types of the central processing unit 401, the memory 402, and the user interface 403 of the electronic device 400 should not be limited in the present invention. For example, the central processing unit 401 can be, but not limited to, a general microprocessor, a dedicated microprocessor, an ASIC (Application Specific Integrated Circuit), or a combination of the microprocessor, the dedicated processor, and the ASIC. Of course, the central processing unit 401 can be any type as long as the central processing unit 401 can provide an operating system and processing capabilities to run various application programs. Preferably, the central processing unit 401 is configured to run the control system 100. The memory 402 may be, but not limited to, RAM (Random Access Memory, random access memory), ROM (Random-Only Memory, read only memory), flash memory, optical disk, hard disk, mobile hard disk, USB disk, etc., wherein the memory 402 can be any type as long as it can store the data and the executable code, while the central processing unit 401 can read the data and the executable code stored in the memory 402. Preferably, the memory 402 is configured to store at least a portion of data resources of the control system 100. The user interface 403 may be, but not limited to, a USB interface, a Bluetooth interface, a Wi-Fi interface, or the like.

In addition, the electronic device 400 further comprises a display screen 404 communicably connected to the central processing unit 401, wherein the display screen 404 is arranged to display images and data. It is worth mentioning that the display screen 404 may be any suitable display screen, such as a liquid crystal display (LCD), a light-emitting diode-based display (LED), an organic light-emitting diode-based display (OLED), a cathode ray Tube display (CRT), analog TV, digital TV, etc. In other example of the electronic device 400 of the present invention, the display screen 404 may also be a touch screen to allow a user to interact and communicate with the electronic device 400 through the display screen 404, so as to allow the user to interact and communicate with the control system 100 through the display screen 404.

In addition, the electronic device 400 further comprises an image acquisition device 405, wherein the image acquisition device 405 is communicably connected to the central processing unit 401 to allow the central processing unit 401 to acquire an optical image of the displayed object 300, i.e. an optical real image thereof, by the image acquisition device 405.

In one example of the electronic device 400 of the present invention, the image acquisition device 405 may be directly and communicatively connected to the central processing unit 401. In another example of the electronic device 400 of the present invention, the image acquisition device 405 may be connected to the central processing 401 through the user interface 403. It is worth mentioning that the optical image involved in the control system 100 of the present invention refers to the image related to the displayed object 300, wherein the optical image can be a visible image or an invisible image, which should not be limited by the control system 100 of the present invention regarding the image.

Nevertheless, a person who skilled in the art should understand that, in another example of the control system 100 of the present invention, an additional or supplemental can be connected to the central processing unit 401 through the user interface 403. It is worth mentioning that the type of the image acquisition device 405 should not be limited in the control system 100 of the present invention, as long as it can acquire the optical image of the displayed object 300. For example, the image acquisition device 405 may be, but not limited to, a camera.

Figure 4:
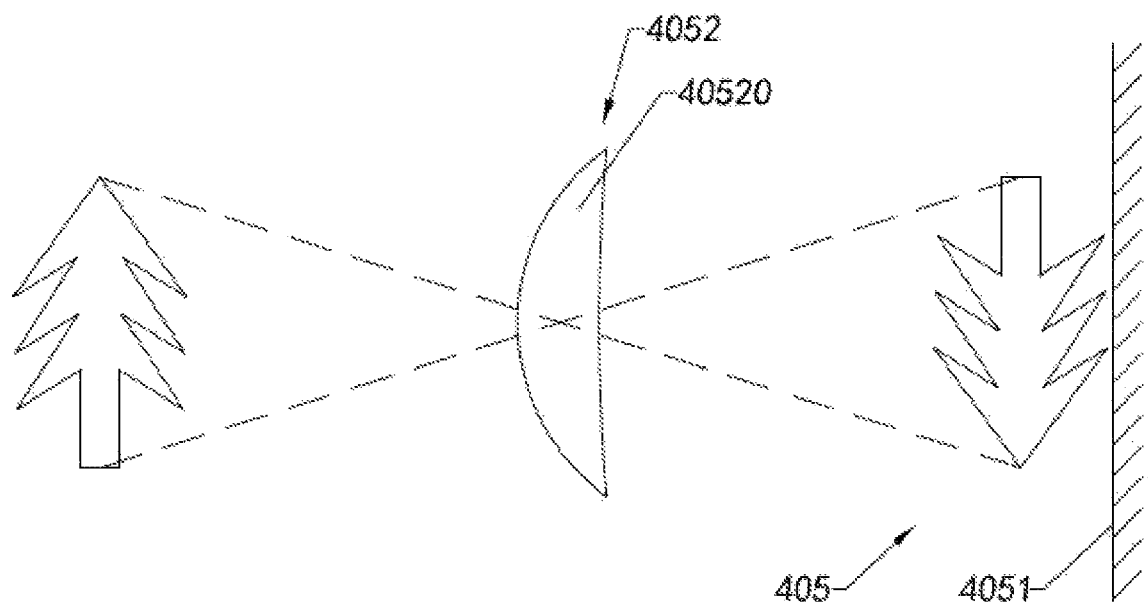
FIG. 4 illustrates an image acquisition device of the electronic device of the light fixture according to the above preferred embodiment of the present invention.

FIG. 4 illustrates an example of the image acquisition device 405, wherein the image acquisition device 405 is arranged to acquire the optical image of the displayed object 300 to be displayed. Specifically, the image acquisition device 405 comprises a photoelectric conversion chip 4051 and a lens module 4052, wherein the lens module 4052 is held in the photosensitive path of the photoelectric conversion chip 4051, such that after the light reflected by the displayed object 300 and passed through the lens module 4052 into the image acquisition device 405, the photoelectric conversion chip 4051 will receive the light in order to perform photoelectric conversion to obtain the optical image regarding the displayed object 300 to be displayed.

It is worth mentioning that the lens module 4052 is constructed to have at least one lens 40520, wherein the number of the lenses 40520 of the lens module 4052 is not limited in the control system 100 of the present invention. For example, the lens module 4052 can be constructed to have a single lens 40520. However, a person who skilled in the art should understand that in other possible examples of the control system 100, the lens module 4052 can be constructed to have two, three, four five, six, seven or more lenses 40520. When the lens module 4052 is constructed to have a single lens 40520, the lens 40520 is preferably a convex lens.

It should be understood that, in some embodiments of the present invention, when there is a single lens 40520, the lens 40520 is configured as an imaging aperture to generate an image of the displayed object 300 through the aperture, or the lens 40520 can be set as an optical spherical mirror. Then, it can be further understood that when two or more lenses 40520 are configured, the lenses 40520 can be configured by a combination of at least one of a convex lens, a concave lens, an optical spherical lens, and an imaging aperture.

Preferably, the lens module 4052 can be driven to move along the photosensitive path of the photoelectric conversion chip 4051 to move at a position relative to the photoelectric conversion chip 4051 in order to adjust a focal length of the image acquisition device 405 for obtaining a better image by the image acquisition device 405. Optionally, the image acquisition device 405 is rotatable, such that the lens module 4052 of the image acquisition device 405 can move to face different directions. For example, when the illuminated object 301 moves in the display environment 302, the image acquisition device 405 can rotate synchronously with the movement of the illuminated object 301 in the display environment 302, such that the image acquisition device 405 can obtain the optical image of the illuminated object 301, i.e. the optical real image thereof, in a real time manner.

As shown in FIG. 1, the control system 100 comprises an information collection unit 10, a processing unit 20, a detection unit 30, an expert database 40, a search unit 50, a scheme generation module 60, and a control unit 70. The processing unit 20 is communicatively connected to the information collection unit 10. The detection unit 30 is communicatively connected to the processing unit 20. The search unit 50 is communicatively connected to the detection unit 30 and the expert database 40. The scheme generation module 60 is communicatively connected to the search unit 50. The control unit 70 is communicatively connected to the scheme generation module 60.

The information collection unit 10 is configured to obtain the optical image of the displayed object 300 via the communicatively connection of the image acquisition device 405. The communication connection method between the information collection unit 10 and the image acquisition device 405 can be a wireless connection or a wired connection. Preferably, the information collection unit 10 is communicatively connected to the image acquisition device 405 in a wireless connection. The image acquisition device 405 is configured to obtain the optical image of the displayed object 300 by photographing the displayed object 300 in a real time manner. Preferably, the information collection unit 10 can be communicatively connected to the photoelectric conversion chip 4051 of the image acquisition device 405 in order to enable the information collection unit 10 to receive the optical image of the displayed object 300 from the photoelectric conversion chip 4051 of the image acquisition device 405.

Furthermore, before using the image acquisition device 405 to acquire the optical image of the displayed object 300, a predetermined type of light can be emitted to the displayed object 300. For example, the color, color temperature, intensity, etc. of the light emitted to the displayed object 300 can be preset in advance as required. After the light is emitted to the displayed object 300 to illuminate the displayed object 300, the image acquisition device 405 can be used to photograph the displayed object 300 to obtain the optical image thereof. A person who skilled in the art should understand that, at this time, the color of the optical image of the displayed object 300 acquired by the image acquisition device 405 is different from the true color of the displayed object 300. The characteristic value of the color of the obtained optical image of the displayed object 300 and the characteristic value of the color of the light emitted to the displayed object 300 can determine the chromaticity of the optical image of the displayed object 300. Through such configuration, the control system 100 can control the status of the light fixture 200 in order to better match the status of the light fixture 200 with the real-time status of the displayed object 300.

The processing unit 20 is configured to receive the optical image of the displayed object 300 from the information collection unit 10, wherein the processing unit 20 is also configured to analyze the optical image of the illuminated object 301 of the displayed object 300 for processing and mixing light to obtain a light group. Specifically, the processing unit 20 further comprises a processing module 21 and a light blending module 22, wherein the light blending module 22 is communicatively connected to the processing module 21. The processing module 21 is communicatively connected to the information collection unit 10. The detection unit 30 is communicatively connected to the light blending module 22.

The processing module 21 is configured to receive the optical image of the displayed object 300 from the information collection unit 10, wherein the processing module 21 is configured to analyze and process the optical image of the displayed object 300 to obtain the optical image of the illuminated object 301 of the displayed object 300. The light blending module 22 is configured to blend and mix the chromaticity of the optical image of the illuminated object 301 to obtain the light group of the illuminated object 301. It is worth mentioning that the light blending mode of the light blending module 22 to the chromaticity of the optical image of the illuminated object 301 should not be limited in the control system 100 of the present invention. For example, in an example of the control system 100 of the present invention, the light blending mode of the light blending module 22 can average all chromaticities or specific chromaticities included in the chromaticity of the optical image of the illuminated object 301 to obtain the light group. For example, the specific chromaticity included in the chromaticity of the optical image of the illuminated object 301 may be the main chromaticity of the illuminated object 301. Specifically, the chromaticity of the optical image of the illuminated object 301 may include the specific chromaticity that can affect the visual effect of the illuminated object 301. In another example of the control system 100 of the present invention, the light blending module 22 may first analyze the optical image of the illuminated object 301 to obtain a RGB combination ratio value of all chromaticities or a RGB value of a specific chromaticity contained in the optical image of the illuminated object 301. Then, the RGB combination ratio values of all the chromaticities or the RGB combination ratio values of the specific chromaticity are averaged to obtain the light group. A person who skilled in the art should understand that RGB in the RGB combination ratio value involved in the present invention is a color mode, that is, the RGB color mode. By providing or determining the RGB combination ratio value, a specific color of chromaticity can be determined. A person who skilled in the art should also understand that in other specific examples of the control system 100 of the present invention, the light blending module 22 may also use other light blending modes. For example, the light blending module 22 may first analyze the optical image of the illuminated object 301 to obtain RGB combined ratio values of all chromaticities contained in the optical image of the illuminated object 301. Then, all the RGB combination ratio values of chromaticities or the RGB combination ratio values of specific chromaticities are mixed in a preset manner to obtain the light group, wherein the preset method can be reduced in half, doubled, reduced by a certain amount, increased by a certain amount, and mapped to other chromaticities based on the RGB values of all chromaticities or the RGB combined ratio of specific chromaticities.

It is worth mentioning that the above mentioned detection method of the present invention for detecting the RGB combination ratio of the chromaticity of the light group related to the illuminated object 301 is merely an example. In another example of the control system 100, it is also possible to directly perform chromaticity detection on the light group related to the illuminated object 301 to determine the type of the light group according to the chromaticity of the light group.

It is worth mentioning that, in another embodiment of the control system 100 of the present invention, the information collecting unit 10 is able to directly obtain the light group of the illuminated object 301 of the displayed object 300. That is, in this example of the control system 100, the control system 100 does not need to capture the optical image of the illuminated object 301 of the displayed object 300 through the image acquisition device 405, and in the subsequent process, the processing unit 20 is configured to analyze the optical image of the illuminated object 301 of the displayed object 300 to obtain the light group of the illuminated object 301 of the displayed object 300. Specifically, in this example of the control system 100 of the present invention, the information collection unit 10 is communicatively connected to at least one color sensor, wherein the color sensor can be, but not limited to, TCS230 categorized sensor. The information collection unit 10 can directly obtain the light group from the illuminated object 301 of the displayed object 300 through the color sensor. The detection unit 30 can be communicatively connected to the information collection unit 10 for enabling the detection unit 30 to directly perform chromaticity detection on the light group obtained by the information collection unit 10 regarding the illuminated object 301 of the displayed object 300. Generally, the image acquisition unit 405 is configured to simultaneously obtain the optical image of the illuminated object 301 of the displayed object 300 and the optical image of the display environment 302, wherein the status of the light fixture 200 is subsequently adjusted depending on the status of the illuminated object 301. Especially, when the display environment 302 is remains unchanged, the adjustment of the status of the light fixture 200 is almost entirely depended on the status of the illuminated object 301. Therefore, after the optical image of the displayed object 300 is acquired by the image acquisition unit 405, the processing module 21 is required to partition the optical image of the illuminated object 301 in the optical image of the displayed object 300 and the optical image of the display environment 302.

Furthermore, the processing module 21 comprises an analysis sub-module 211 and an identification sub-module 212, wherein the identification sub-module 212 is communicatively connected to the analysis sub-module 211. The analysis sub-module 211 is communicatively connected to the information collection unit 10, wherein the light blending module 22 is communicatively connected to the identification sub-module 212. After receiving the optical image of the displayed object 300 from the information collection unit 10, the analysis sub-module 211 is configured to analyze the optical image of the displayed object 300 to obtain an analysis result. The identification sub-module 212 is configured to identify the optical image of the displayed object 300 according to the analysis result obtained by the analyzing sub-module 211, so as to distinguish between the optical image of the illuminated object 301 and the optical image of the display environment 302 contained in the optical image of the displayed object 300. The light blending module 22 is configured to mix the chromaticity of the optical image of the illuminated object 301 to obtain the light group.

Figure 5A:
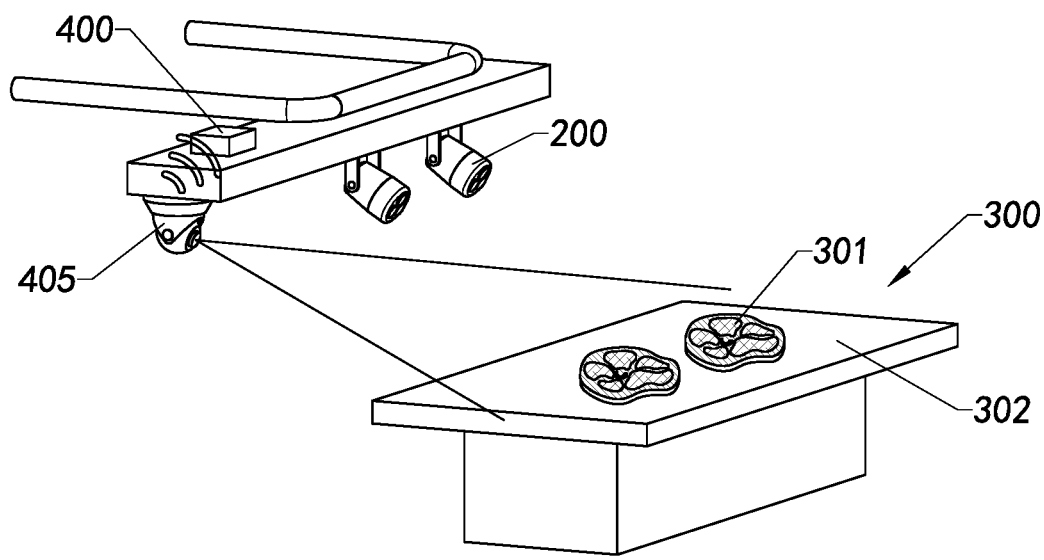
FIGS. 5A and 5B illustrate an example of an operation of the control system of the light fixture according to the above preferred embodiment of the present invention.
Figure 5B:
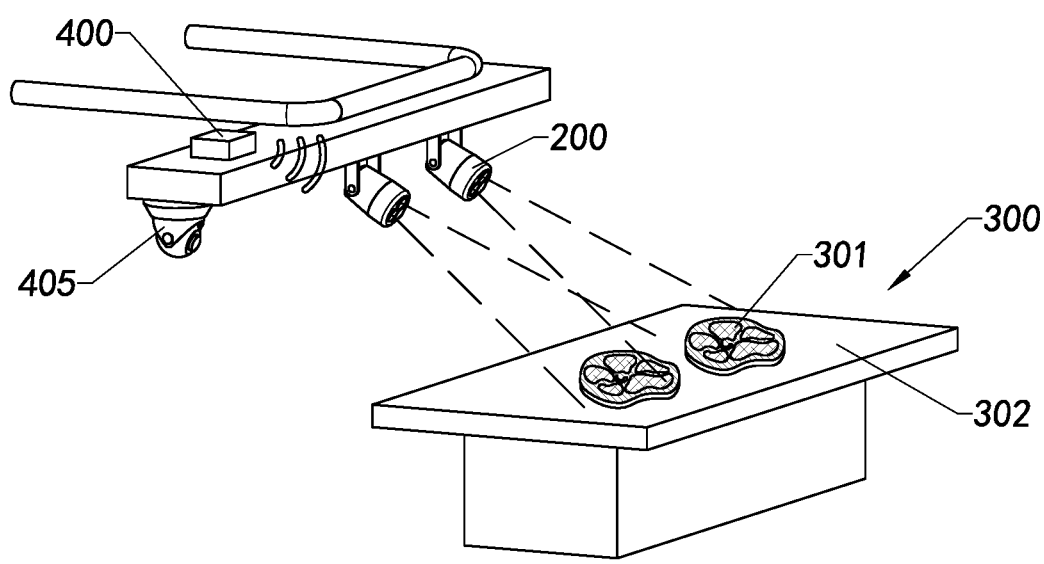

For the displayed object 300 in condition that both the displayed object 301 and the display environment 302 are remain unchanged, after the information collection unit 10 collects the optical image of the displayed object 300 acquired by the image acquisition device 300, the analysis sub-module 211 is configured to analyze the chromaticity change in the optical image of the displayed object 300. The identification sub-module 212 is configured to distinguish the illuminated object 301 and the display environment 302 according to the chromaticity change in the optical image of the displayed object 300 analyzed by the analyzing sub-module 211, such that the optical image of the illuminated object 301 and the optical image of the display environment 302 are distinguished. As shown in FIGS. 5A and 5B as an example of a food market place, a meat product to be sold is embodied as the illuminated object 301, wherein the display environment 302 can be a countertop for placing meat product or a hanging frame for hanging meat product in suspending manner. It can be understood that the meat product as the illuminated object 301 while the countertop and/or the hanging frame as the display environment 302 are remain unchanged, the image acquisition device 405 is configured to simultaneously obtain an optical image of the meat product of the illuminated object 301 and an optical image of the countertop and/or the hanging frame as the display environment 302. Generally, in order to highlight the meat product as the illuminated object 301, the chromaticity of the countertop and/or the hanging frame as the display environment 302 and the chromaticity of the meat product as the illuminated object 301 are so different. Subsequently, after analyzing the chromaticity of the meat product as the illuminated object 301 and the chromaticity of the countertop and/or the hanging frame as the display environment 302 through the analysis sub-module 211, the identification sub-module 212 is configured to distinguish the optical image of the illuminated object 301 from the optical image of the display environment 302 according to the analysis result of the analysis sub-module 211.

For the displayed object 300 in condition that the illuminated object 301 changes while the display environment 302 remains unchanged, after obtaining the optical image of the displayed object 300, the processing module 21 is also configured to distinguish the optical image of the illuminated object 301 and the optical image of the display environment 302 by the difference between the chromaticity of the illuminated object 301 and the chromaticity of the display environment 302. In addition, for another example of the control system 100 of the present invention, the analysis sub-module 211 is configured to analyze at least two optical images of the displayed object 300 to determine a changing portion of the optical image of the displayed object 300, such that, subsequently, the identification sub-module 212 is configured to distinguish the optical image of the illuminated object 301 from the optical image of the display environment 302. It can be understood that after analyzing at least two optical images of the displayed object 300, the changing portion of the optical image of the displaced object 300 is considered as the optical image of the illuminated object 301 while an unchanged portion of the optical image of the displaced object 300 is considered as the optical image of the display environment 302. As shown in FIGS. 6A to 6D as an example of a fashion show walkway, a model is embodied as the illuminated object 301, wherein the walkway is embodied as the display environment 302. It can be understood that the walkway as the display environment 302 remains unchanged, and the model as the illuminated object 301 walks on the walkway. When at least two optical images of the displayed object 300 are obtained at different times, the analysis sub-module 211 is configured to easily obtain the optical image of the displayed object 300 after analyzing these optical images to determine which portion is changing, i.e. the changing portion, and which portion is unchanged, i.e. the unchanged portion. Therefore, the identification sub-module 212 is configured to distinguish the optical image of the illuminated object 301 in the displayed object 300 from the optical image of the display environment 302.

For the displayed object 300 in condition that both the illuminated object 301 and the display environment 302 keep changing, after obtaining the optical image of the displayed object 300, the processing module 21 is configured to distinguish the optical image of the illuminated object 301 and the optical image of the display environment 302 in the optical image of the displayed object 300 through the combination of the chromaticity and the motion. For the stage as an example, after obtaining the optical image of the stage, the processing module 21 is configured to distinguish the optical image of the illuminated object 301 and the optical image of the display environment 302 in the optical image of the displayed object 300 through the combination of the chromaticity and the motion.

The detection unit 30 is communicatively connected to the light blending module 22 of the processing unit 20, wherein the detection unit 30 is configured to perform the chromaticity detection from the light group obtained by the light blending module 22 so as to obtain a detection result. For example, the detection unit 30 can perform RGB combination ratio value detection from the light group in order to determine the RGB combination ratio value of the light group. It is worth mentioning that different types of the light groups correspond to different RGB combination ratio values. In addition, it should be understood that there is a corresponding relationship between the RGB combination ratio value of the light group and the chromaticity of the optical image of the illuminated object 301.

It is worth mentioning that the above mentioned detection unit 30 can obtain the detection result by detecting the RGB combination ratio value of the light group as merely an example, wherein it should not be considered as a limitation on the content and scope of the control system 100 of the present invention. In other words, there should have other possible examples of the control system 100 that the detection unit 30 can also detect other properties of the light group.

The expert database 40 is communicatively connected to memory 402 of the electronic device 400 to provide at least one chromaticity to be output, wherein the chromaticity to be output provided by the expert database 40 is provided by experienced experts (such as designers, lighting engineers, etc.) based on their experiences. In other words, the conclusions made by experienced experts after multiple tests are stored in the memory 402 to form the chromaticity to be output, wherein the test content of experienced experts is that the illuminated object 301 at different statuses in the display environment 302 is provided in response to the type of light and the illumination angle of the light. For example, when the illuminated objects 301 at different statuses are placed in the same display environment 302, the type of light and the illumination angle of the light to be provided for the illuminated object 301 are different. At this time, the expert can provide different chromaticities to be output according to the experiences and store them in the memory 402. For another example, for the illuminated object 301 at the same status in different display environments 302, the type of light and the illumination angle of the light to be provided for the illuminated object 301 are different. At this time, the expert can provide different chromaticities to be output according to the experiences and store it in the memory 402.

The search unit 50 is communicatively connected to the detection unit 30 and the expert database 40, wherein the search unit 50 is configured to receive the detection result from the detection unit 30 and search the corresponding chromaticity to be output from the expert database 40 according to the detection result. A person who skilled in the art should understand that the chromaticity to be output provided by the expert database 40 corresponds to the detection result obtained by the detection unit 30 in a one-to-one manner. Therefore, the search unit 50 is able to search the corresponding chromaticity to be output from the expert database 40 according to the detection result provided by the detection unit 30.

The scheme generation module 60 comprises a control scheme generation module 61, wherein the control scheme generation module 61 is communicatively connected to the search unit 50. The control scheme generation module 61 is configured to generate a control program or scheme according to the chromaticity to be output corresponding to the detection result about the light group searched by the search unit 50. It is worth mentioning that the content of the control scheme includes the scheme of how to control the light fixture 200, such that the light generated by the light fixture 200 can illuminate the illuminated object 301 to enhance the display effect of the illuminated object 301. For example, the control scheme includes the light intensity, the light color, the color temperature, and the illumination angle of the light generated by the light fixture 200.

The control unit 70 comprises a control module 71, wherein the control module 71 is communicatively connected to the control scheme generation module 61. The control module 71 is communicatively connected to the light fixture 200, wherein the light fixture 200 is adapted to be controlled by the control module 71. The control module 71 is configured to receive the control scheme from the control scheme generation module 71, and to control at least one of the light fixtures 200 according to the content of the control scheme when executing the control plan, so as to provide light to illuminate the illuminated object 301, thereby enhancing the display effect of the illuminated object 301.

It is worth mentioning that the type of the light fixture 200 should not be limited in the control system 100 of the present invention. For example, the light fixture 200 can be, but not limited to, a dual color temperature LED light source, a WRGB light source, a RGB light source, or a combination of the above light sources.

Furthermore, when the control module 71 is configured to control the light fixture 200 to illuminate the illuminated object 301 following the content of the control scheme, the image acquisition device 405 can further acquire the optical image of the displayed object 300. Then, the processing module 21 of the processing unit 20 is configured to distinguish the optical image of the illuminated object 301 from the optical image of the display environment 302 after analyzing and processing the optical image of the displayed object 300. Preferably, the image acquisition device 405 is configured to obtain the optical image of the displayed object 300 in a real-time manner to obtain the real time optical image of the displayed object 300. Subsequently, the processing module 21 of the processing unit 20 is configured to obtain the real-time optical image of the illuminated object 301, i.e. the optical image of the illuminated object 301 in a real time manner. The scheme generation module 60 further comprises an adjustment scheme generation module 62, i.e. a toning scheme generation module, wherein the adjustment scheme generation module 62 is communicatively connected to the processing module 21 of the processing unit 20 and the adjustment scheme generation module 62 is configured to generate an adjustment scheme according to the real-time optical image of the illuminated object 301. It is worth mentioning the content of the adjustment scheme includes a scheme of how to adjust the light fixture 200, wherein after the light generated by the light fixture 200 to illuminate the illuminate object 301, the display effect of the illuminate object 301 can be further enhanced. For example, the adjustment scheme should include the light intensity, the light color, the color temperature, the illumination angle of the light, etc, generated by the light fixture 200.

The control unit 70 further comprises an adjustment module 72, i.e. a toning module, wherein the adjustment module 72 is communicatively connected to the adjustment scheme generation module 62. The adjustment module 72 is also communicatively connected to the light fixture 200, wherein the light fixture 200 can be controlled by the adjustment module 72. The control module 72 is configured to receive the adjustment scheme from the adjustment scheme generation module 62, and to control at least one of the light fixtures 200 according to the content of the adjustment scheme when executing the adjustment scheme, so as to adjust the type of light to illuminate the illuminated object 301 for further improving the display effect of the illuminated object 301.

Figure 7:
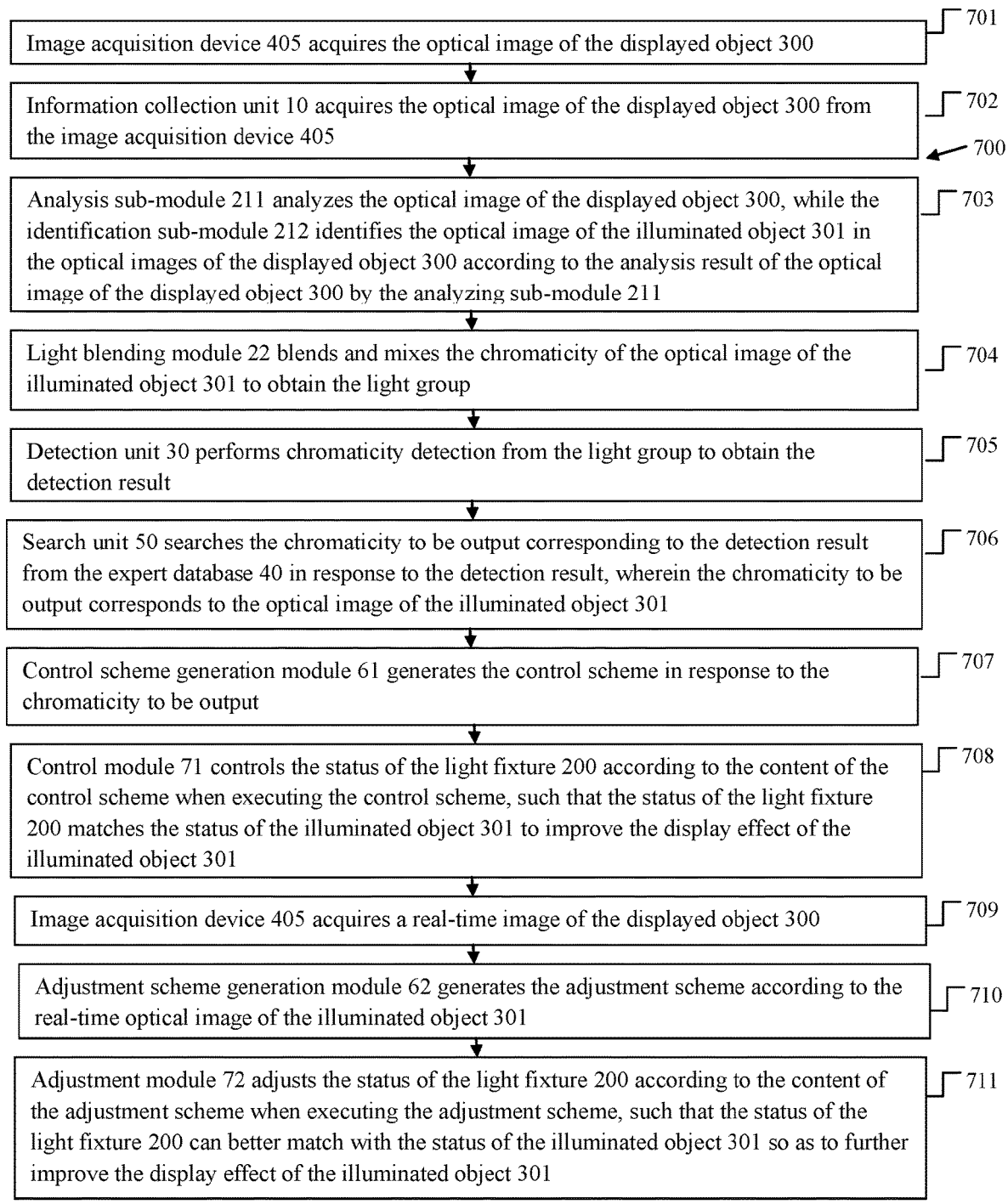
FIG. 7 is a flow diagram illustrating a control system of the light fixture according to the above preferred embodiment of the present invention.

FIG. 7 illustrates a control process 700 of the control system 100 of the present invention, wherein the control system 100 is configured to control at least one status of the light fixture 200, such that the status of the light fixture 200 can match with the status of the displayed object 300, so as to enhance the display effect of the illuminated object 301. The control process 700 includes the following steps.

Figure 6A:
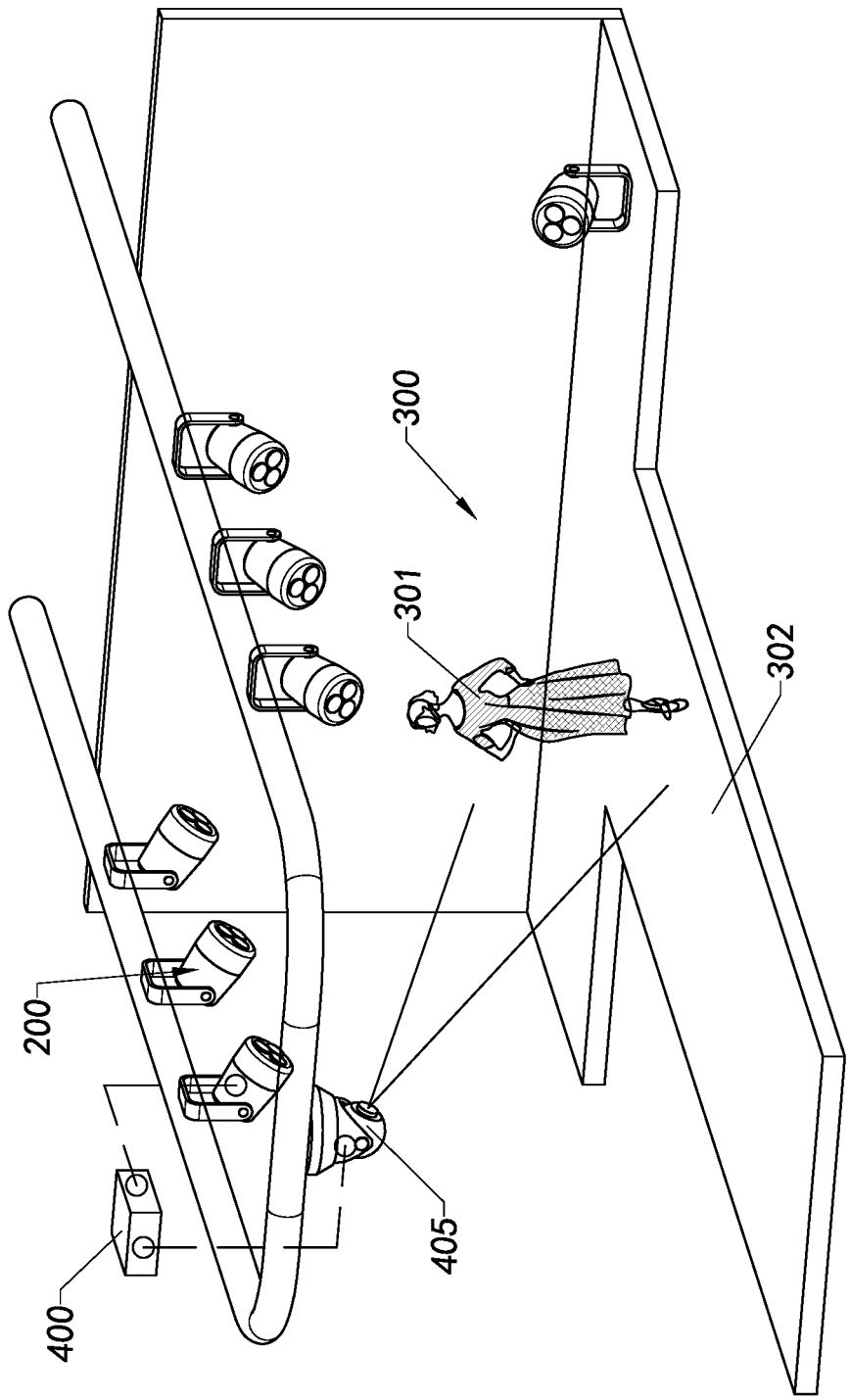
FIGS. 6A to 6D illustrate another example of an operation of the control system of the light fixture according to the above preferred embodiment of the present invention.
Figure 6B:
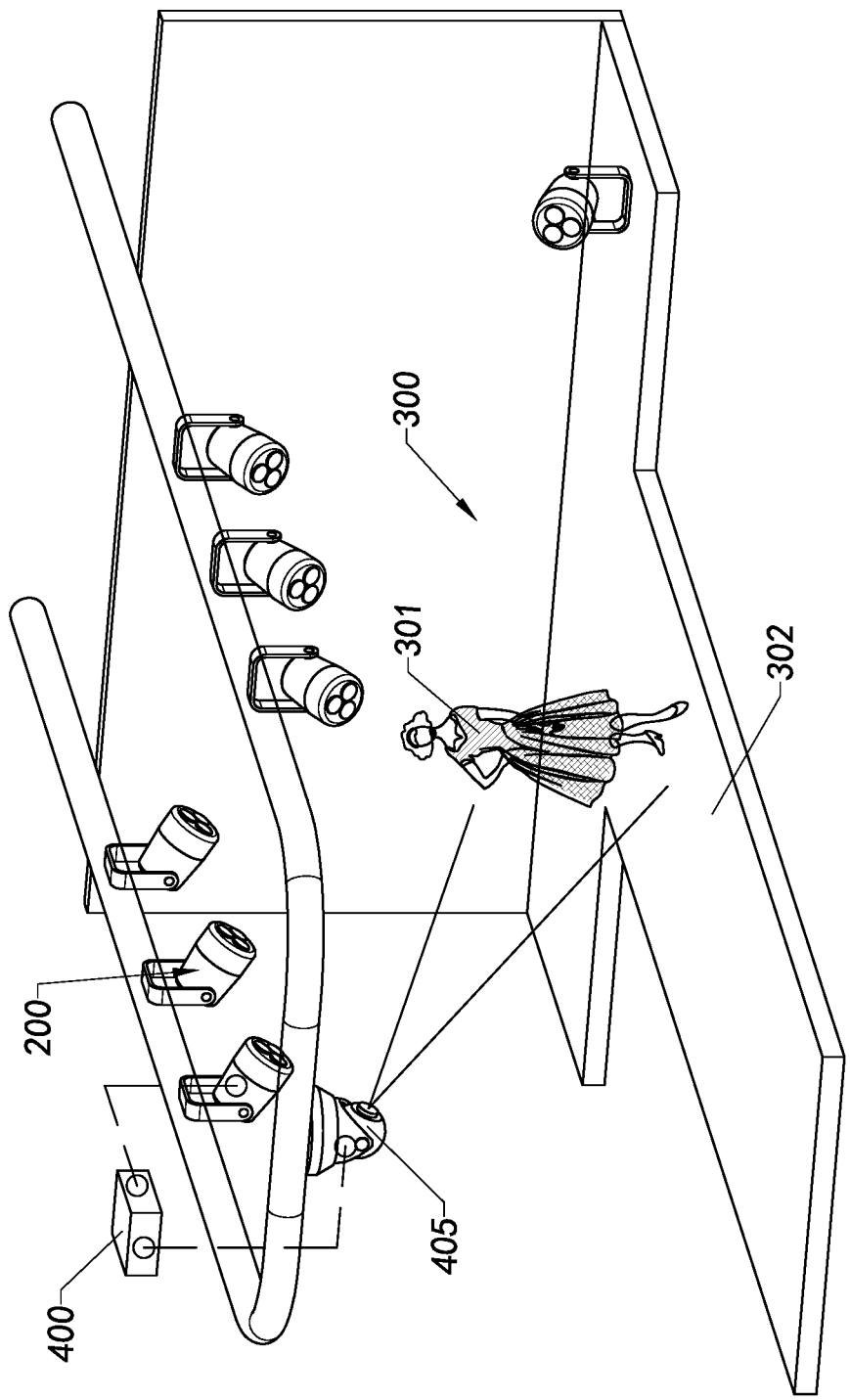
Figure 8A:
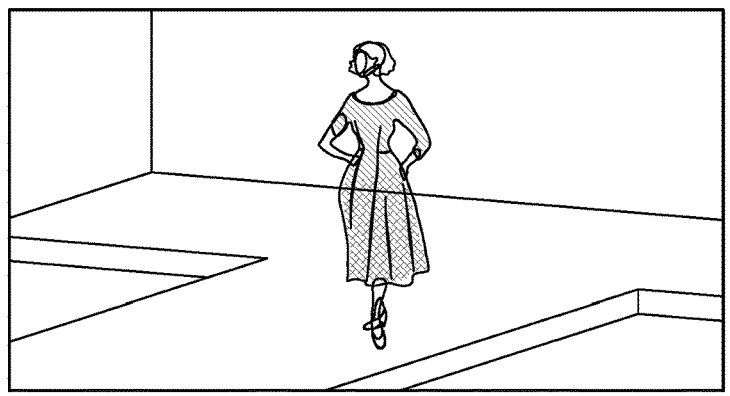
FIGS. 8A to 8D illustrate optical images of an object to be acquired by the control system according to the above preferred embodiment of the present invention.
Figure 8B:
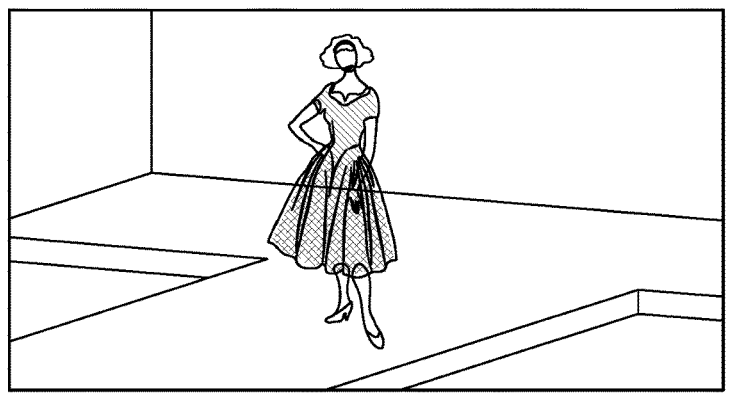

In stage 701, the image acquisition device 405 is configured to acquire the optical image of the displayed object 300. For example, at the stage shown in FIGS. 6A and 6B, one or more of the image acquisition devices 405 can be set on the top of the walkway, wherein the image acquisition device 405 is configured to obtain the optical image of the displayed object 300 by taking pictures or shooting videos. It should be understood that the optical image of the displayed object 300 includes not only the optical image of the walkway as the display environment 302 but also the optical image of the model as the illuminated object 301. Preferably, the image acquisition device 405 is rotatable in such a manner that the image acquisition device 405 is driven to rotate as the model as the illuminated object 301 moves, such that the optical image of the illuminated object 301 is always kept at a predetermined position of the optical image of the object 300. For example, through the above mentioned method, the optical image of the illuminated object 301 can always be maintained at the middle position of the optical image of the displayed object 300. FIGS. 8A and 8B illustrate the optical images of the displayed object 300 acquired by the image acquisition device 405 at different time periods, wherein the model moves at different movements. The optical image of the displayed object 300 as shown in FIG. 8A corresponds to the status of the displayed object 300 as shown in FIG. 6A. Correspondingly, the optical image of the displayed object 300 as shown in FIG. 8B corresponds to the status of the displayed object 300 as shown in FIG. 6B.

In stage 702, the information collection unit 10 is configured to acquire the optical image of the displayed object 300 from the image acquisition device 405. The information collection unit 10 is communicatively connected to the image acquisition device 405, such that after the image acquisition device 405 acquires the optical image of the displayed object 300, the information collection unit 10 can receive the optical image of the object 300 from the image acquisition device 405.

Figure 8C:
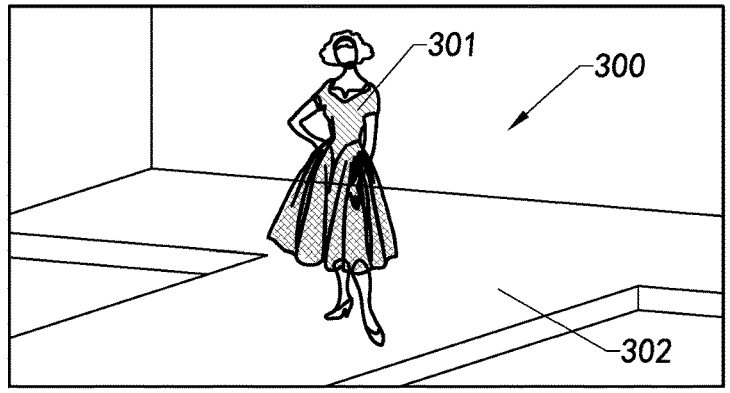

In stage 703, the analysis sub-module 211 is configured to analyze the optical image of the displayed object 300, while the identification sub-module 212 is configured to identify the optical image of the illuminated object 301 in the optical images of the displayed object 300 according to the analysis result of the optical image of the displayed object 300 by the analyzing sub-module 211. For an example of the control system 100 of the present invention, the analysis sub-module 211 is configured to analyze the optical image of the displayed object 300 as shown in FIGS. 8A and 8B. After analyzing the optical image of the displayed object 300 as shown in FIGS. 8A and 8B, the changing portion and the unchanging portion, i.e. stationary portion, can be obtained in FIGS. 8A and 8B. The identification sub-module 212 is configured to distinguish the changing portion in the optical image of the displayed object 300 as the optical image of the illuminated object 301, and to distinguish the unchanging portion of the optical image of the displayed object 300 as the optical image of the display environment 302, referring to FIG. 8C. It should be understood that once the optical image of the illuminated object 301 and the optical image of the display environment 302 in the optical image of the displayed object 300 are determined, i.e. once the optical image of the model and the optical image of the walkway are determined, the model and the walkway can also be determined, such that the position of the model on the walkway can also be determined. Nevertheless, a person who skilled in the art should understand that in other possible examples of the control system 100 of the present invention, by analyzing the chromaticity of the displayed object 300, the analysis sub-module 211 can also make the identification sub-module 212 to subsequently distinguish between the optical image of the illuminated object 301 and the optical image of the display environment 302 in the displayed object 300. Alternatively, by analyzing the chromaticity and movement of the displayed object 300, the identification sub-module 212 is configured to subsequently distinguish between the optical image of the illuminated object 301 and the optical image of the display environment 302 in the displayed object 300.

In stage 704, the light blending module 22 is configured to blend and mix the chromaticity of the optical image of the illuminated object 301 to obtain the light group. Preferably, the light blending module 22 is configured to mix all the chromaticities or specific chromaticities of the optical image of the illuminated object 301 through a preset light blending mode, so as to obtain the light group. For example, the light blending module 22 is configured to mix all chromaticities or specific chromaticities of the clothing worn by the model and the optical image of skin color. The light blending mode of the light blending module 22 is to average all chromaticities or specific chromaticities of the optical image of the illuminated object 301. Nonetheless, a person who skilled in the art should understand that the above mentioned method used by the light blending module 22 to average all the chromaticities or specific chromaticities of the optical image of the illuminated object 301 is only an example. It should not be limited in the content and scope of the control system 100 of the present invention.

In stage 705, the detection unit 30 is configured to perform chromaticity detection from the light group to obtain the detection result. For example, the detection unit 30 is configured to detect the RGB combination ratio value of the light group to determine the RGB combination ratio value of the light group.

In stage 706, the search unit 50 is configured to search the chromaticity to be output corresponding to the detection result from the expert database 40 in response to the detection result, wherein the chromaticity to be output corresponds to the optical image of the illuminated object 301.

In stage 707, the control scheme generation module 61 is configured to generate the control scheme in response to the chromaticity to be output. The content of the control scheme includes the scheme of how to control the light fixture 200, such that the light generated by the light fixture 200 can illuminate the illuminated object 301 to improve the display effect of the illuminated object 301.

Figure 6C:
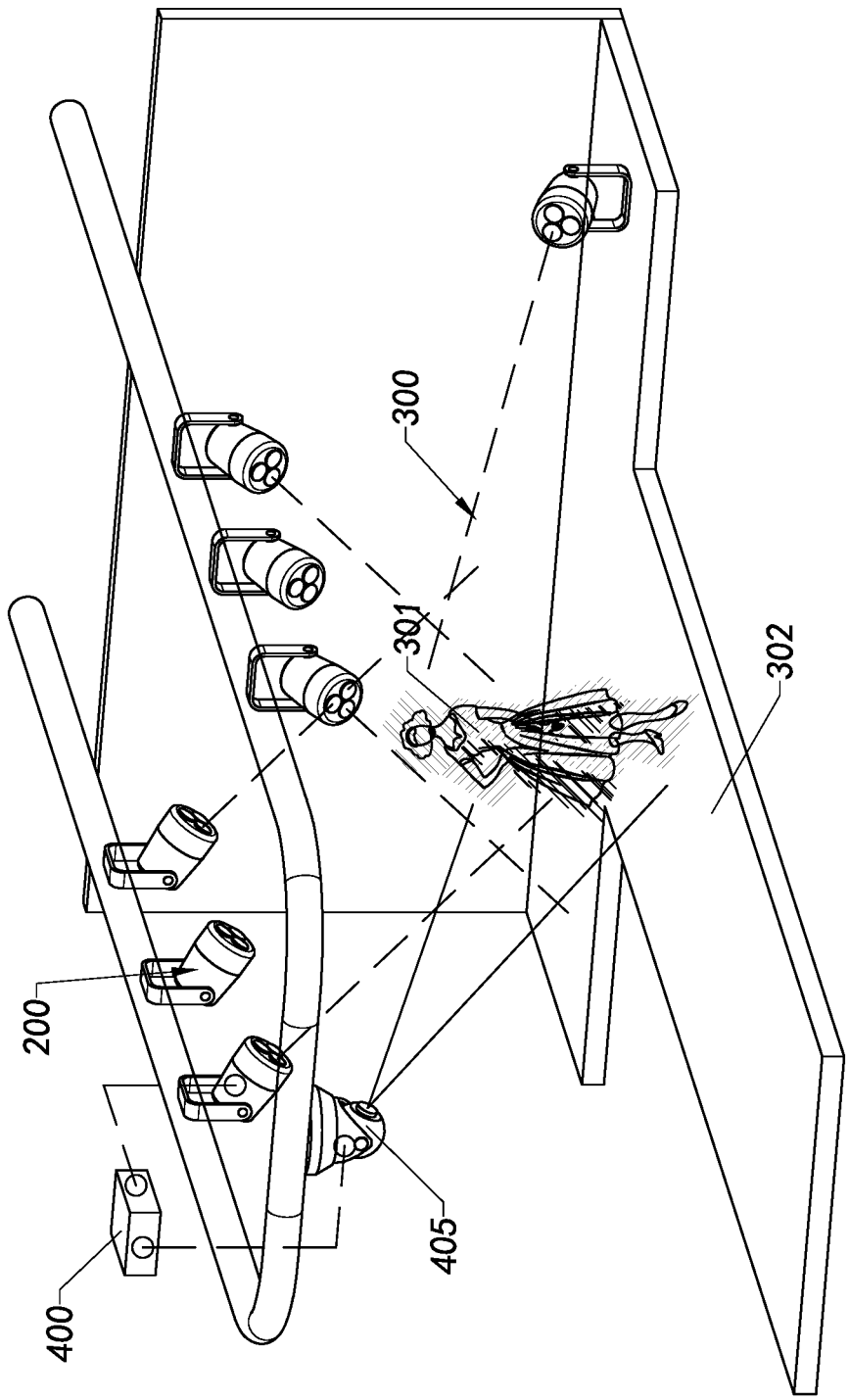

In stage 708, the control module 71 is configured to control the status of the light fixture 200 according to the content of the control scheme when executing the control scheme, such that the status of the light fixture 200 matches the status of the illuminated object 301 to improve the display effect of the illuminated object 301. As shown in FIG. 6C, the status of the light fixture 200 is adjusted relative to the status of the light fixture 200 shown in FIGS. 6A and 6B, such that the light generated by the light fixture 200 projects on the model to improve the display effect of the model.

Figure 8D:
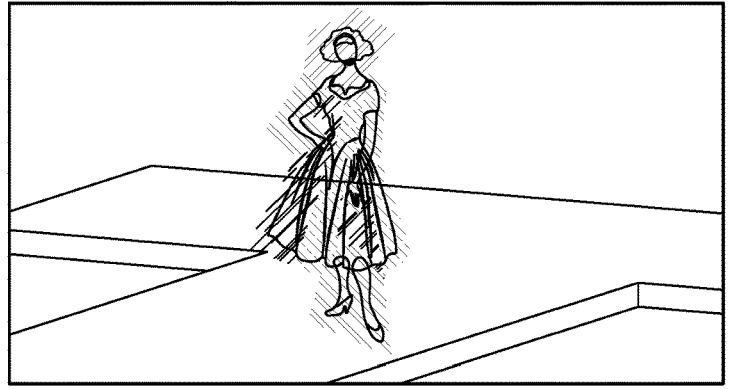

In stage 709, the image acquisition device 405 is configured to acquire a real-time image of the displayed object 300. As shown in FIG. 8D, the image acquisition device 405 is configured to further acquire the optical image of the displayed object 300 as shown in FIG. 6C, wherein the optical image of the displayed object 300 as shown in FIG. 8D corresponds to the status of the displayed object 300 as shown in FIG. 6C. Preferably, the image acquisition device 405 is configured to detect the real-time optical image of the displayed object 300 in a real time manner in order to obtain the optical image of the displayed object 300 in real time.

In stage 710, the adjustment scheme generation module 62 is configured to generate the adjustment scheme according to the real-time optical image of the illuminated object 301. The content of the adjustment scheme includes a scheme of how to adjust the light fixture 200, such that the light generated by the light fixture 200 can illuminate the illuminated object 301 enough to further improve the display effect of the illuminated object 301.

Figure 6D:
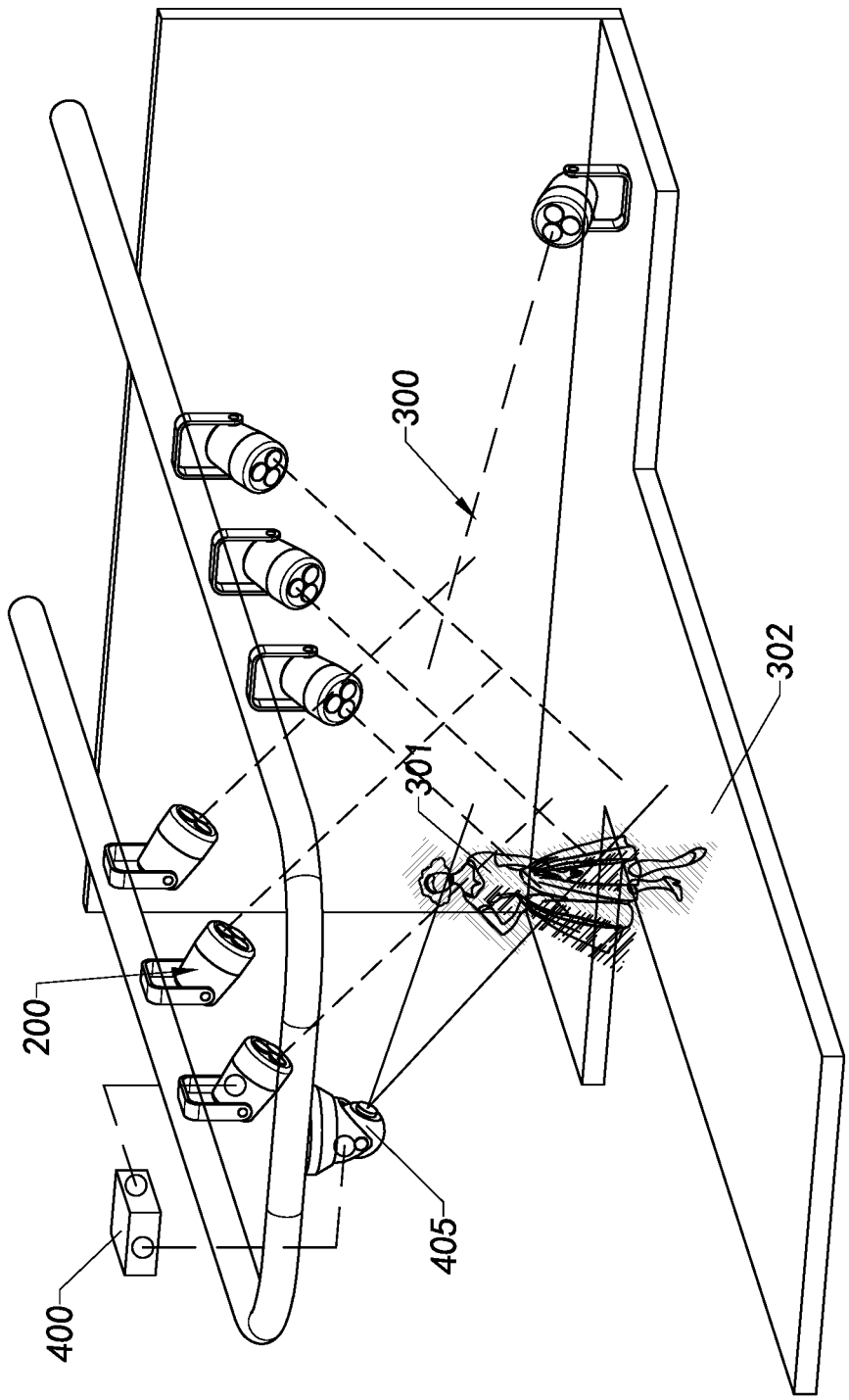

In stage 711, the adjustment module 72 is configured to adjust the status of the light fixture 200 according to the content of the adjustment scheme when executing the adjustment scheme, such that the status of the light fixture 200 can better match with the status of the illuminated object 301 so as to further improve the display effect of the illuminated object 301. As shown in FIG. 6D, the status of the light fixture 200 is adjusted relative to the status of the light fixture 200 as shown in FIG. 6C, such that the light generated by the light fixture 200 can illuminate the model, so as to improve the display effect of the model.

Figure 9:
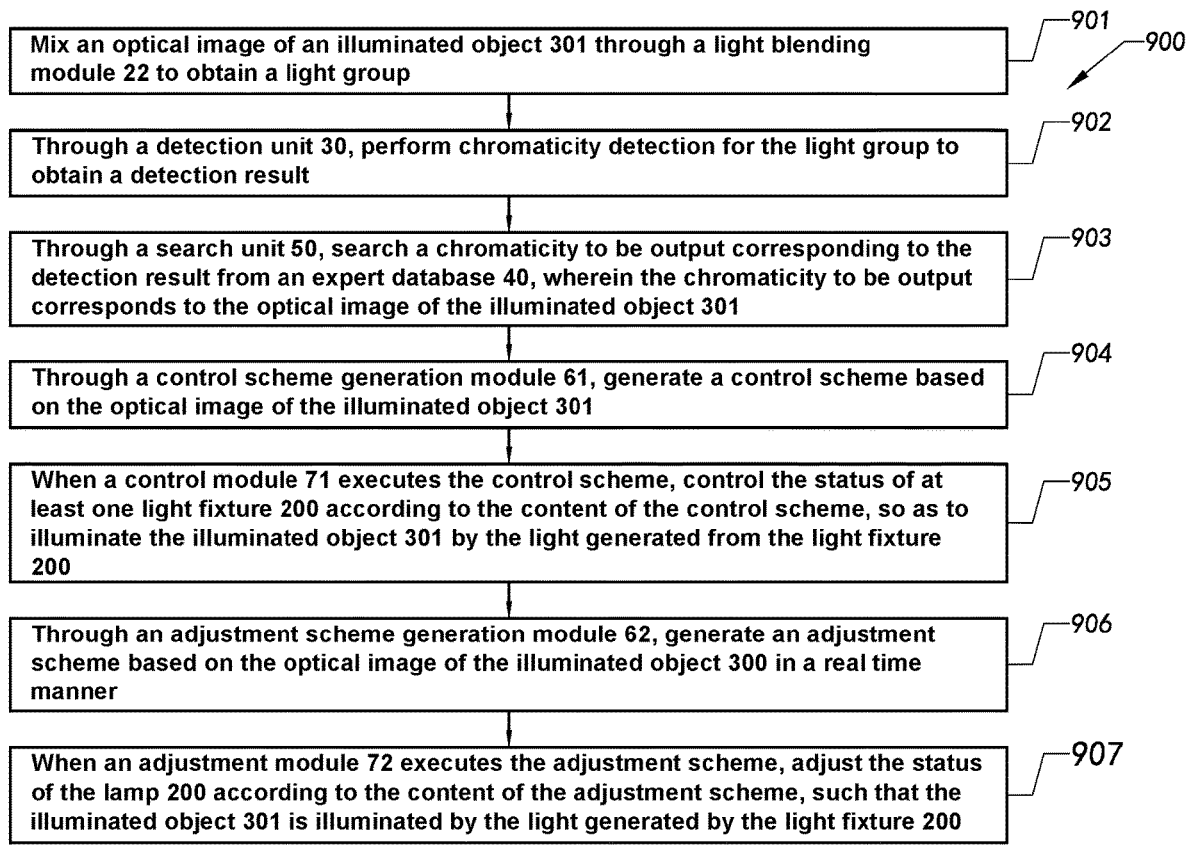
FIG. 9 is a flow diagram illustrating a control method of the light fixture according to the above preferred embodiment of the present invention.

FIG. 9 illustrates a control method 900 of the light fixture 200, wherein the control method 900 comprises the following steps.

Step 901: Blend and mix an optical image of an illuminated object 301 through a light blending module 22 to obtain a light group.

Step 902: Through a detection unit 30, perform chromaticity detection for the light group to obtain a detection result.

Step 903: Through a search unit 50, search a chromaticity to be output corresponding to the detection result from an expert database 40, wherein the chromaticity to be output corresponds to the optical image of the illuminated object 301.

Step 904, Through a control scheme generation module 61, generate a control scheme based on the optical image of the illuminated object 301.

Step 905: When a control module 71 executes the control scheme, control the status of at least one light fixture 200 according to the content of the control scheme, so as to illuminate the illuminated object 301 by the light generated from the light fixture 200.

Step 906: Through an adjustment scheme generation module 62, generate an adjustment scheme based on the optical image of the illuminated object 300 in a real time manner.

In step 907: When an adjustment module 72 executes the adjustment scheme, adjust the status of the lamp 200 according to the content of the adjustment scheme, such that the illuminated object 301 is illuminated by the light generated by the light fixture 200.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A control system for controlling at least one light fixture generating light to illuminate an illuminated object, wherein the control system comprises:
  a scheme generation module, wherein said scheme generation unit comprises a control scheme generation module, wherein said control scheme generation module is configured to generate a control scheme based on an optical image of the illuminated object;
  a control unit, wherein said control unit comprises a control module, wherein said control module is communicatively connected to said control scheme generation module, wherein said control module is configured for controllably connecting to the light fixture, wherein said control unit is configured for controlling a status of the light fixture according to a content of said control scheme when said control unit executes said control scheme;
  a processing unit, wherein said processing unit is configured for blending and mixing a chromaticity of the optical image of the illuminated object to obtain a light group;
  a detection unit, wherein said detection unit is communicatively connected to said processing unit, wherein said detection unit is configured for performing chromaticity detection on said light group to obtain a detection result;

an expert database, wherein said expert database provides at least one data of chromaticity to be output; and a search unit, wherein said search unit is communicatively connected to said detection unit and said expert database, wherein said control scheme generation module is communicatively connected to said search unit, wherein said search unit is configured to search said chromaticity to be output corresponding to said detection result from said expert data, wherein said chromaticities to be output is searched corresponding to the optical image of the illuminated object.

2. The control system, as recited in claim 1, further comprising an information collection unit, wherein said information collection unit is communicatively connected to said processing unit, wherein said information collection unit is communicatively connected to an image acquisition device, wherein said image acquisition device is configured for acquiring the optical image of the illuminated object.

3. The control system, as recited in claim 1, wherein said processing unit further comprises a processing module and a light blending module, wherein said light blending module is communicatively connected to said processing module and said detection unit, wherein said processing module is configured for analyzing the optical image of the illuminated object to determine a chromaticity of the optical image of the illuminated object, wherein said light blending module is configured for blending and mixing the chromaticity of the optical image of the illuminated object in a predetermined light blending mode to obtain said light group.

4. The control system, as recited in claim 3, wherein said light blending module is configured to blend and mix all chromaticities of the illuminated object in said predetermined light blending mode to obtain said light group, alternatively, said light blending module is configured to blend and mix a specific chromaticity of the illuminated object in said predetermined light blending mode to obtain said light group.

5. The control system, as recited in claim 3, wherein said light blending mode of said light blending module is to average all chromaticities or specific chromaticities of the optical image of the illuminated object.

6. The control system, as recited in claim 3, wherein said processing module further comprises an analysis sub-module and an identification sub-module, wherein said identification sub-module is communicatively connected to said analysis sub-module, wherein said light blending module is communicatively connected to said identification sub-module, wherein said analysis sub-module is configured for analyzing an optical image of a displayed object, wherein said identification sub-module is configured for identifying the optical image of the illuminated object in the optical image of the displayed object according to said analysis result of the optical image of the displayed object by said analysis sub-module.

7. A control system for controlling at least one light fixture generating light to illuminate an illuminated object, wherein the control system comprises:

a scheme generation module, wherein said scheme generation unit comprises a control scheme generation module, wherein said control scheme generation module is configured to generate a control scheme based on an optical image of the illuminated object;

a control unit, wherein said control unit comprises a control module, wherein said control module is communicatively connected to said control scheme generation module, wherein said control module is configured for controllably connecting to the light fixture, wherein said control unit is configured for controlling a status of the light fixture according to a content of said control scheme when said control unit executes said control scheme;

an information collection unit, wherein said information collection unit is configured to obtain a light group regarding the optical image of the illuminated object;

a detection unit, wherein said detection unit is communicatively connected to said information collection unit, wherein said detection unit is configured to perform chromaticity detection on said light group to obtain a detection result;

an expert database, wherein said expert database provides at least one data of chromaticity to be output; and a search unit, wherein said search unit is communicatively connected to said detection unit and said expert database, wherein said control scheme generation module is communicatively connected to said search unit, wherein said search unit is configured to search said chromaticity to be output corresponding to said detection result from said expert data, wherein said chromaticities to be output is searched corresponding to the optical image of the illuminated object.

8. A control method for a light fixture, comprising the steps of:

(a) blending and mixing the optical image of the illuminated object by a light blending module to obtain a light group;

(b) performing chromaticity detection of said light group by a detection unit to obtain a detection result;

(c) via a search unit, searching a chromaticity to be output corresponding to said detection result from an expert database, wherein said chromaticity to be output corresponds to the optical image of the illuminated object;

(d) generating a control scheme based on an optical image of an illuminated object by a control scheme generation module, wherein said control scheme generated by said control scheme generation module is based on the optical image of the illuminated object; and (e) when executing said control scheme by a control module, controlling a status of at least one light fixture according to a content of said control scheme, such that the light fixture is controlled to generate light for illuminating the illuminated object.

9. The control method, as recited in claim 8, before the step (d), further comprising a step of:

(f) analyzing the optical image of the illuminated object by a processing module to determine a chromaticity of the optical image of the illuminated object, such that, in the step (a), the light blending module is configured to blend and mix the chromaticity of the optical image of the illuminated object in a predetermined light mixing method to obtain said light group.

10. The control method, as recited in claim 8, wherein said light blending module is configured to blend and mix all chromaticities of the illuminated object in said predetermined light blending mode to obtain said light group, alternatively, said light blending module is configured to blend and mix a specific chromaticity of the illuminated object in said predetermined light blending mode to obtain said light group.

11. The control method, as recited in claim 8, wherein said light blending mode of said light blending module is to average all chromaticities or specific chromaticities of the optical image of the illuminated object.

12. The control method, as recited in claim 9, wherein the step (f) further comprises steps of:

(f.1) analyzing an optical image of a displayed object by an analysis sub-module; and
(f.2) via an identification sub-module, identifying the optical image of the illuminated object in the optical image of the displayed object according to said analysis result of the optical image of the displayed object from said analysis sub-module.

13. A control method for a light fixture, comprising the steps of:
(a) obtaining a light group regarding the optical image of the illuminated object via an information collection unit;
(b) performing chromaticity detection of said light group by a detection unit to obtain a detection result;
(c) via a search unit, searching a chromaticity to be output corresponding to said detection result from an expert database, wherein said chromaticity to be output corresponds to the optical image of the illuminated object;
(d) generating a control scheme based on an optical image of an illuminated object by a control scheme generation module, wherein said control scheme generated by said control scheme generation module is based on the optical image of the illuminated object; and
(e) when executing said control scheme by a control module, controlling a status of at least one light fixture according to a content of said control scheme, such that the light fixture is controlled to generate light for illuminating the illuminated object.

14. A control method for a light fixture, comprising the steps of:
(a) generating a control scheme based on an optical image of an illuminated object by a control scheme generation module;
(b) when executing said control scheme by a control module, controlling a status of at least one light fixture according to a content of said control scheme, such that the light fixture is controlled to generate light for illuminating the illuminated object;
(c) via an adjustment scheme generation module, generating an adjustment scheme based on the optical image of the illuminated object in a real time manner; and
(d) when an adjustment module executes the adjustment scheme, controlling the status of the light fixture according to a content of the adjustment scheme.

15. A control method for a light fixture, comprising the steps of:
(a) by communicatively connecting an information collection unit to an image acquisition device, acquiring the optical image of the illuminated object by said image acquisition device;
(b) generating a control scheme based on an optical image of an illuminated object by a control scheme generation module; and
(c) when executing said control scheme by a control module, controlling a status of at least one light fixture according to a content of said control scheme, such that the light fixture is controlled to generate light for illuminating the illuminated object.

16. The control method, as recited in claim 15, wherein the step (c) comprises steps of:
(c.1) emitting a predetermined type of light to the illuminated object;
(c.2) obtaining the optical image of the displayed object after being illuminated with the predetermined type of light; and
(c.3) according to an obtained characteristic value of the color of the optical image of the displayed object and a characteristic value of the predetermined type of light emitted to the illuminated object, obtaining a chromaticity of the optical image of the displayed object.

17. An electronic device, comprising:
a memory, wherein said memory is configured to store at least a portion of data resources of a control system;
a user interface, wherein said user interface is configured to connect to at least one light fixture and at least one image acquisition device; and
a central processing unit, wherein said memory and said user interface are communicatively connected to said central processing unit respectively, wherein said central processing unit executes a control system configured to:
(a) by communicatively connecting an information collection unit to said image acquisition device, acquire an optical image of an illuminated object by said image acquisition device;
(b) via a control scheme generation module, generate a control scheme based on the optical image of the illuminated object;
(c) when a control module executes said control scheme, control a status of at least one light fixture according to a content of said control scheme to illuminate the illuminated object by the light generated by the light fixture;
(d) blend and mix the optical image of the illuminated object by a light blending module to obtain a light group;
(e) perform chromaticity detection of said light group by a detection unit to obtain a detection result; and
(f) via a search unit, search a chromaticity to be output corresponding to said detection result from an expert database, wherein said chromaticity to be output corresponds to the optical image of the illuminated object, such that, in the step (a), said control scheme generated by said control scheme generation module is based on the optical image of the illuminated object.

18. The electronic device, as recited in claim 17, wherein said central processing unit further executes the control system configured to:
(g) analyze the optical image of the illuminated object by a processing module to determine a chromaticity of the optical image of the illuminated object, such that, in the step (c), said light blending module is configured to blend and mix the chromaticity of the optical image of the illuminated object in a predetermined light blending mode to obtain said light group.

19. The electronic device, as recited in claim 18, wherein said central processing unit further executes the control system in the step (g) configured to:
(g.1) analyze the optical image of a displayed object by an analysis sub-module; and
(g.2) via an identification sub-module, identify the optical image of the illuminated object in the optical image of the displayed object according to said analysis result of the optical image of the displayed object from said analysis sub-module.

* * * * *